United States Patent
Major

(10) Patent No.: US 8,572,796 B2
(45) Date of Patent: Nov. 5, 2013

(54) ATTACHABLE AND DETACHABLE PAINTER'S TOOL

(76) Inventor: Willis Gerald Major, Buffalo, NY (US)

( * ) Notice: Subject to any disclaimer, the term of this patent is extended or adjusted under 35 U.S.C. 154(b) by 64 days.

(21) Appl. No.: 12/931,308

(22) Filed: Jan. 28, 2011

(65) Prior Publication Data

US 2011/0308027 A1    Dec. 22, 2011

Related U.S. Application Data

(60) Provisional application No. 61/356,951, filed on Jun. 21, 2010.

(51) Int. Cl.
    *B05C 17/02*    (2006.01)
(52) U.S. Cl.
    USPC ............ 15/230.11; 15/144.1; 492/13; 492/19
(58) Field of Classification Search
    USPC ............ 15/144.1, 144.2, 230.11, 172, 244.2; 16/334, 422, 436, 438, 900; 403/84, 403/91, 94, 97, 103, 104, 106, 108; 492/13, 492/19
    See application file for complete search history.

(56) References Cited

U.S. PATENT DOCUMENTS

| | | | | |
|---|---|---|---|---|
| 2,175,278 A * | 10/1939 | Orebaugh | ........................ | 15/172 |
| 2,675,573 A * | 4/1954 | Strong | ........................ | 15/176.4 |
| 3,984,892 A * | 10/1976 | Kyriakou | ........................ | 15/111 |
| 4,089,082 A | 5/1978 | McGrew | | |
| 4,528,714 A | 7/1985 | Beck | | |
| 4,731,896 A * | 3/1988 | de La Tour | ........................ | 15/106 |
| 5,207,555 A | 5/1993 | Shiral | | |
| 5,410,778 A * | 5/1995 | Langevin | ........................ | 16/429 |
| 6,148,469 A | 11/2000 | Irven | | |
| 6,317,923 B1 * | 11/2001 | Lo | ........................ | 16/110.1 |
| 6,398,653 B1 * | 6/2002 | Chang | ........................ | 463/47.6 |
| 6,457,208 B1 * | 10/2002 | Keith | ........................ | 16/422 |
| 7,028,365 B2 * | 4/2006 | Martin et al. | ........................ | 15/230.11 |
| 7,213,294 B2 * | 5/2007 | Karroll | ........................ | 15/230.11 |
| 7,272,996 B2 * | 9/2007 | Pontieri | ........................ | 81/176.15 |
| 7,707,678 B2 * | 5/2010 | Major | ........................ | 15/230.11 |
| 8,209,818 B2 * | 7/2012 | Lin | ........................ | 16/436 |
| 2002/0078519 A1 * | 6/2002 | Boothby | ........................ | 15/121 |
| 2006/0123578 A1 * | 6/2006 | Rickstrew | ........................ | 15/230.11 |
| 2007/0199412 A1 * | 8/2007 | Lee | ........................ | 81/177.85 |
| 2007/0204418 A1 * | 9/2007 | Vales | ........................ | 15/172 |
| 2008/0050532 A1 * | 2/2008 | Erh | ........................ | 427/428.01 |
| 2008/0172812 A1 * | 7/2008 | Dean | ........................ | 15/22.1 |
| 2008/0276396 A1 * | 11/2008 | Lucero | ........................ | 15/144.2 |

* cited by examiner

*Primary Examiner* — Monica Carter
*Assistant Examiner* — Michael Jennings

(57) ABSTRACT

A painter's tool comprising: a handle and a working arm attached to said handle by means of a polygon shaped mating connection to prevent movement of said working arm relative to handle when in use, said polygon shaped mating connection further having a mating connection comprising a male polygon protrusion inserted into a female polygon cavity such that the mating connection prevents said working arm from moving in relation to said handle when in use.

20 Claims, 37 Drawing Sheets

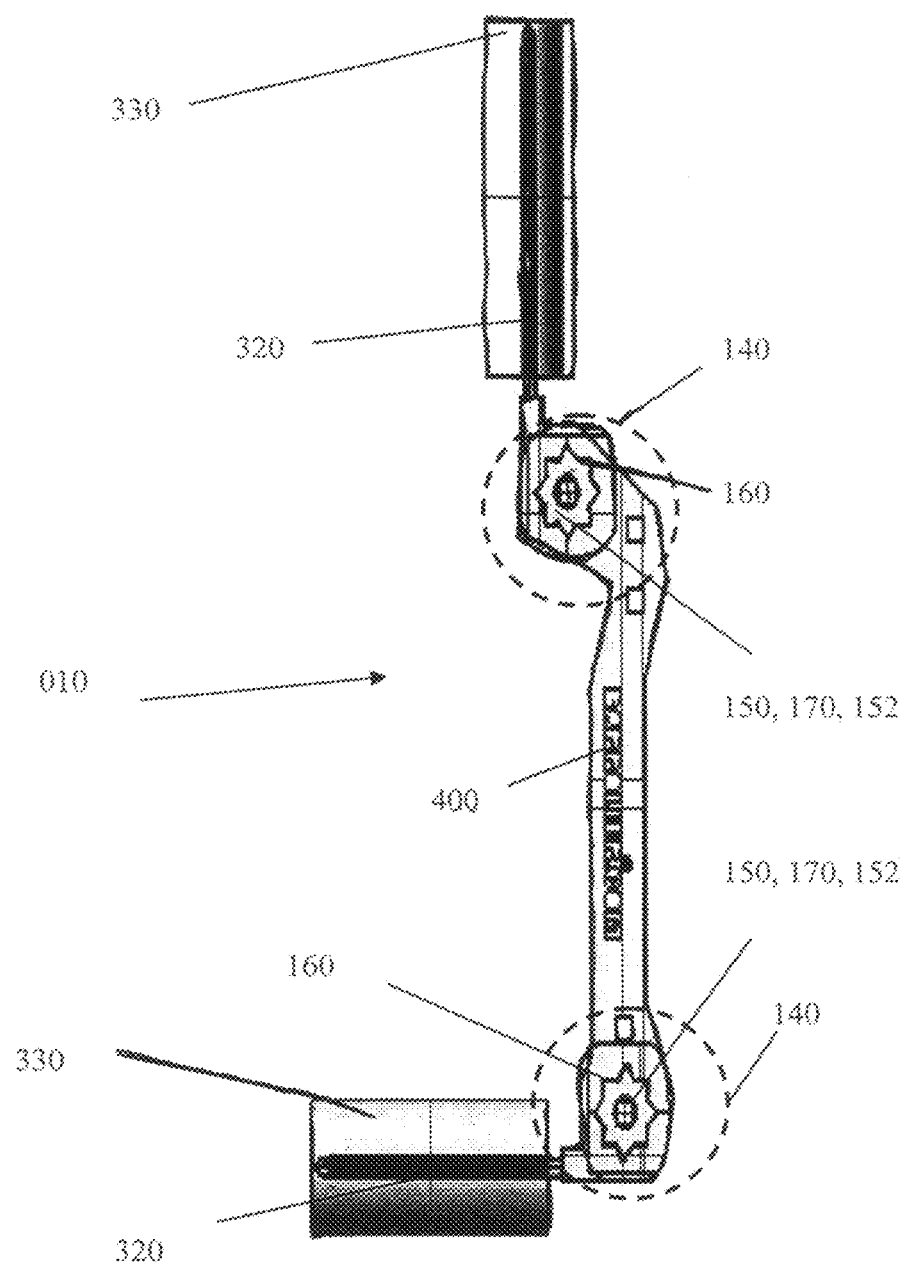

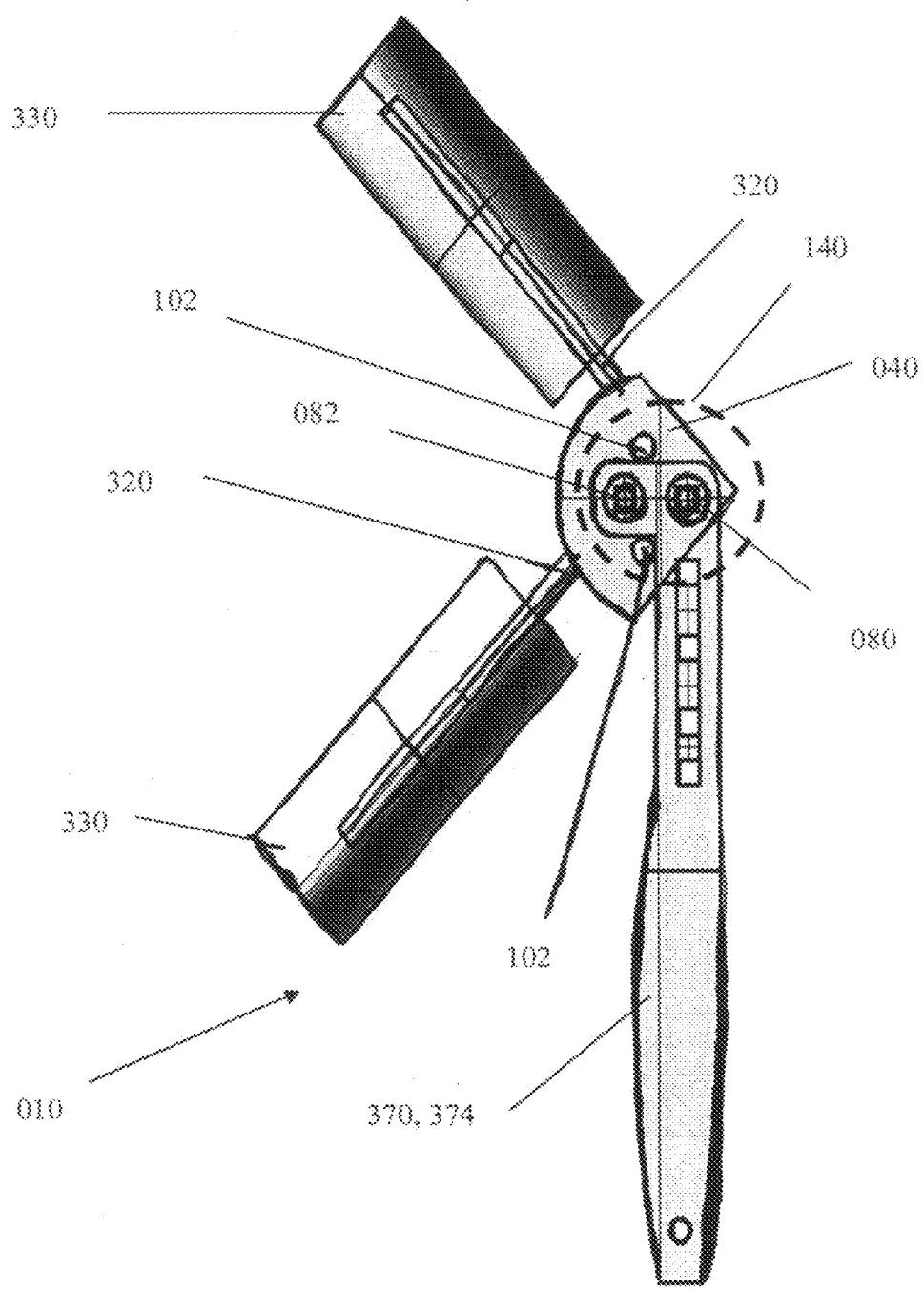

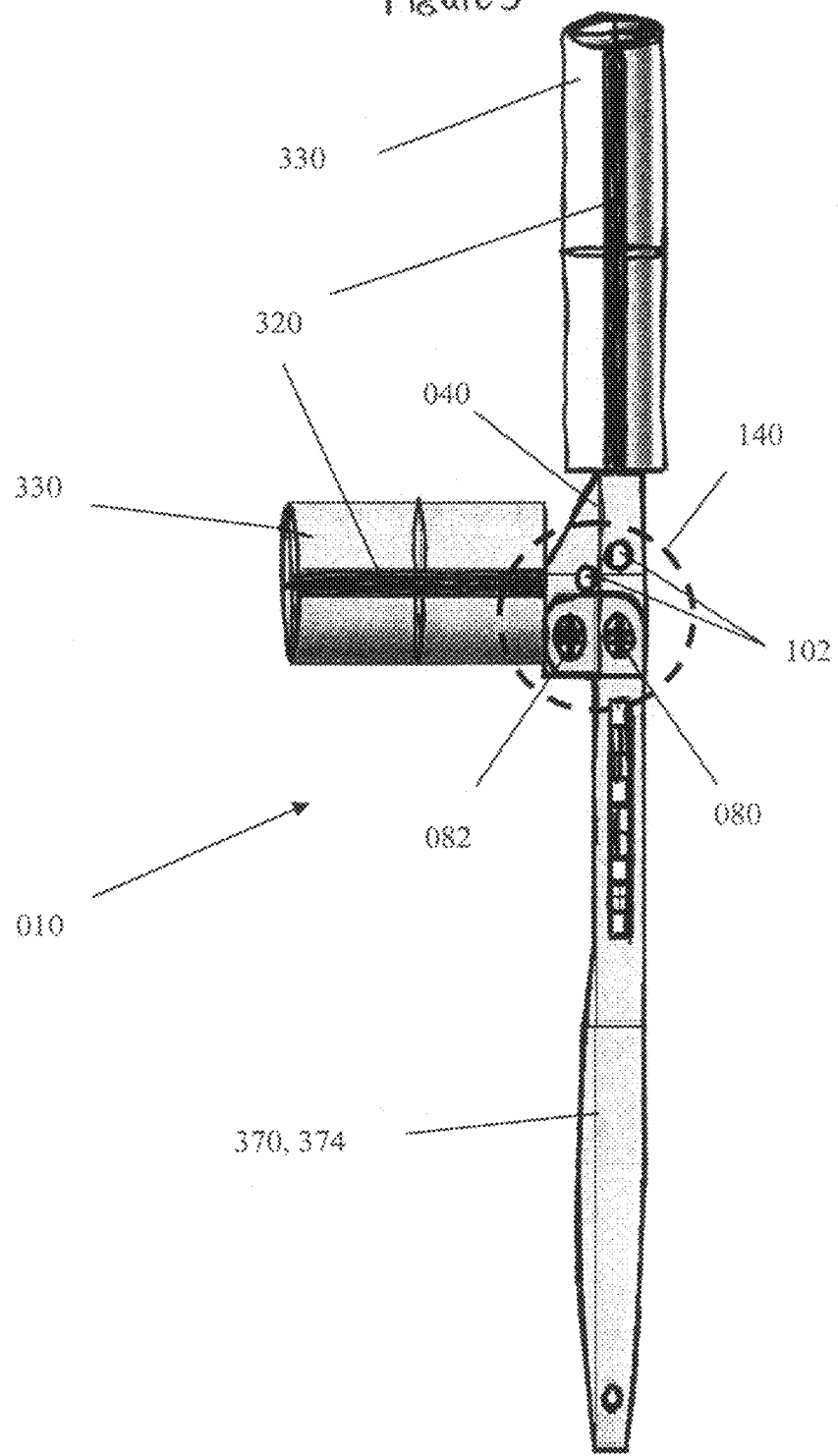

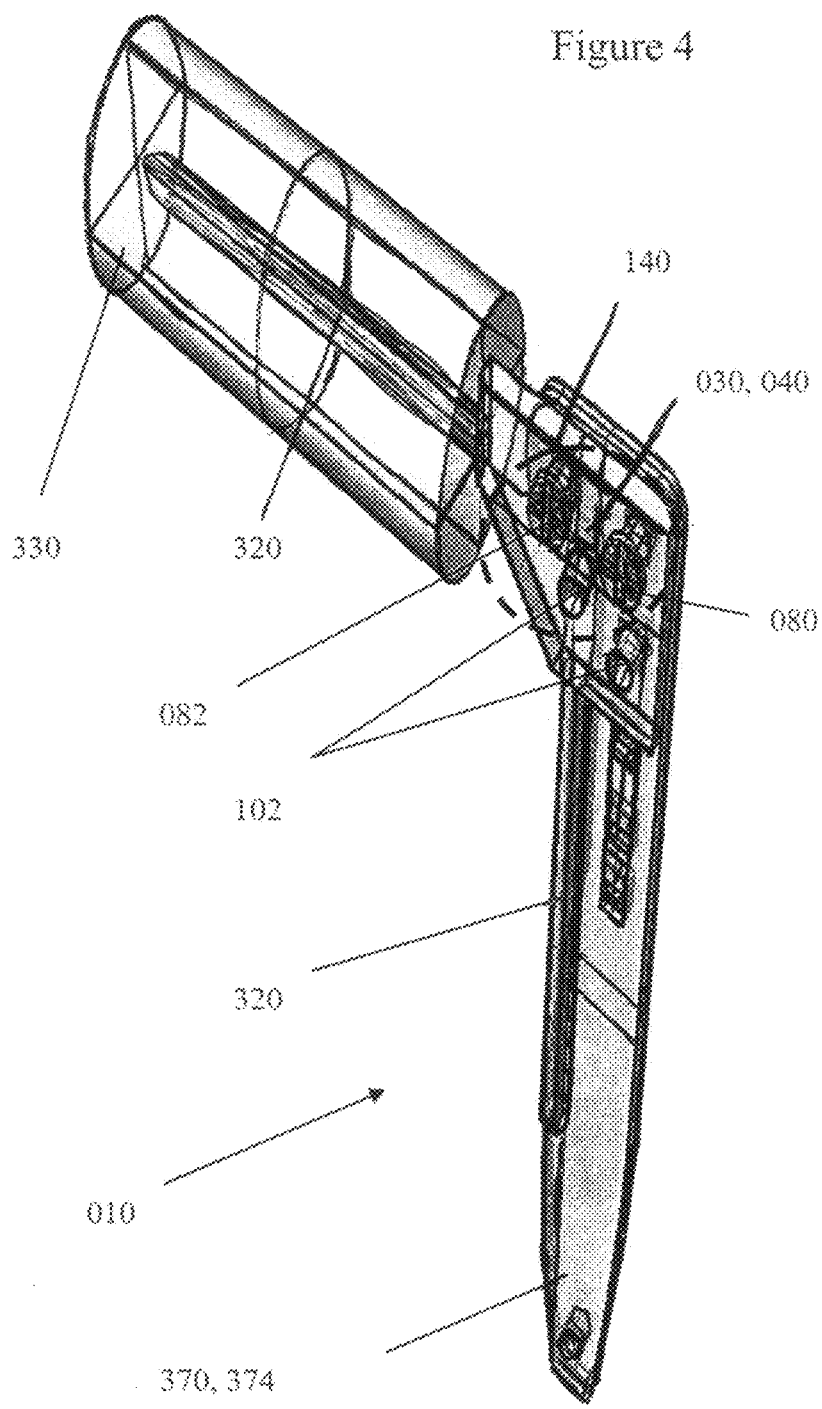

Figure 1A:
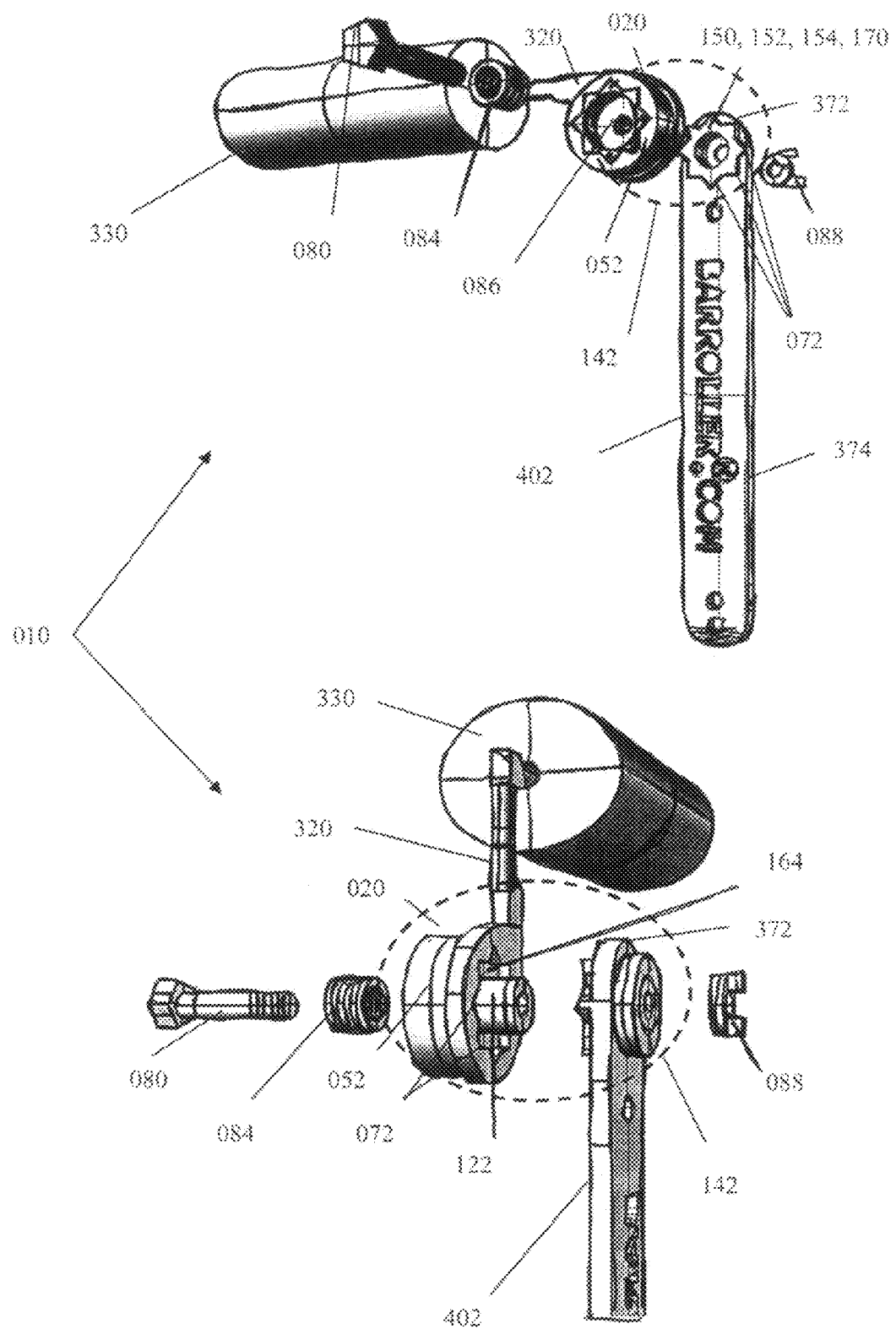

Figure 35
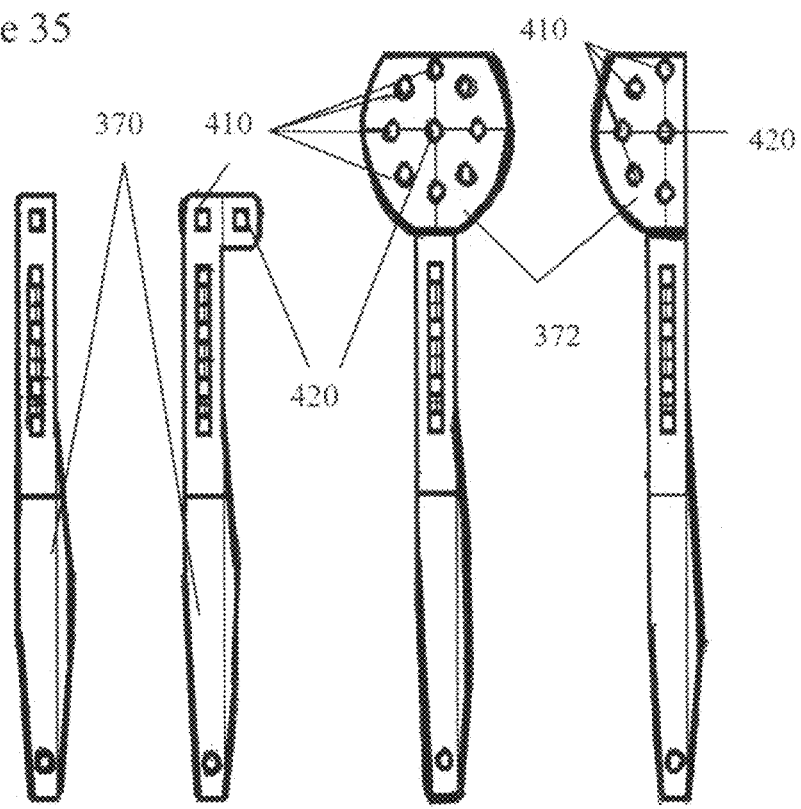
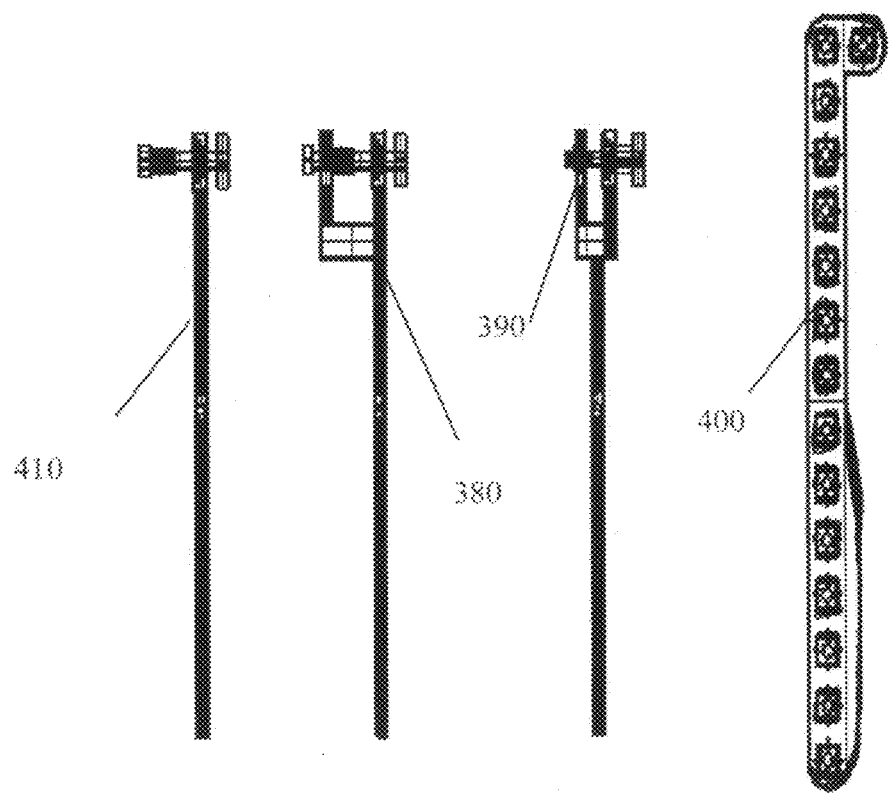

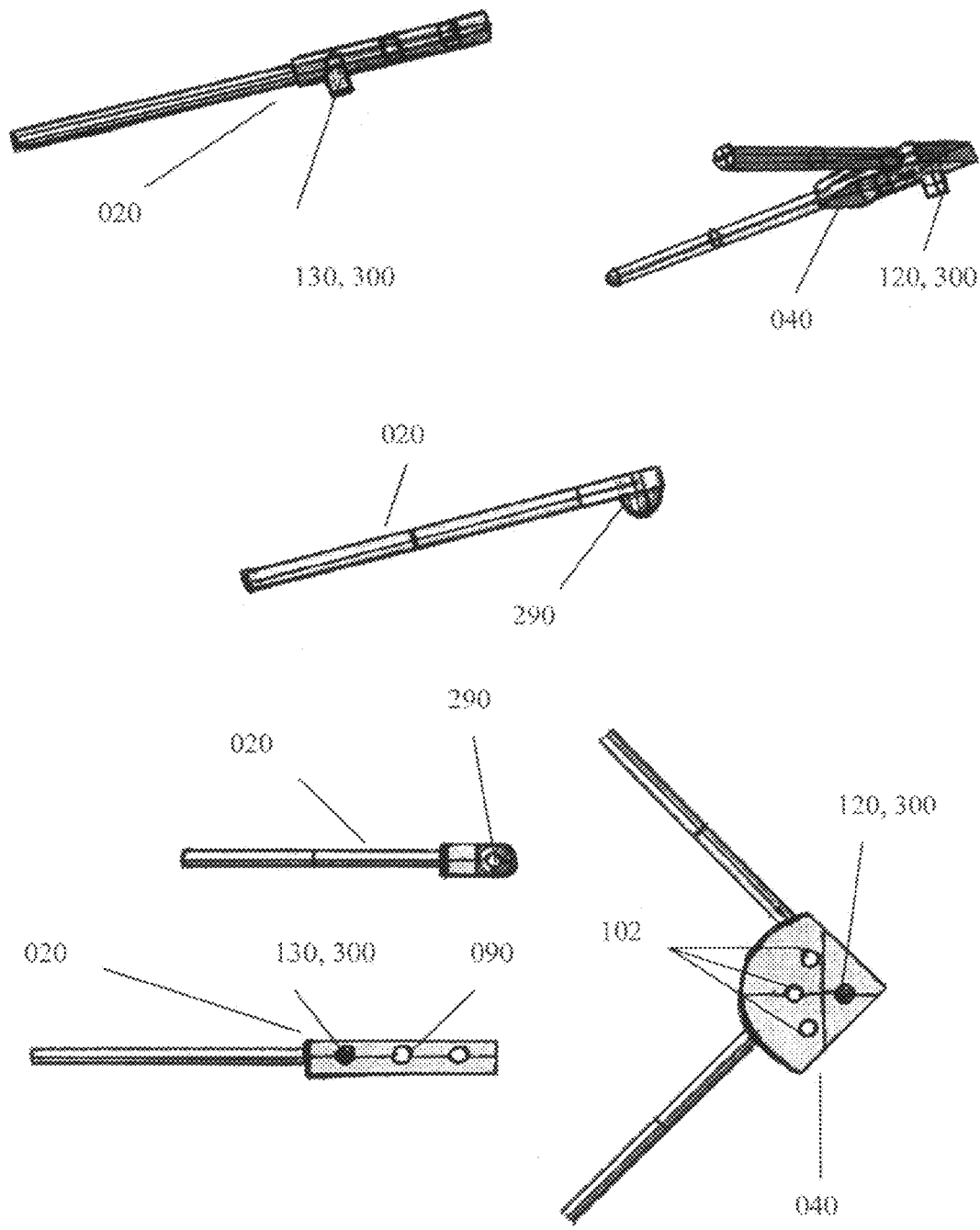

ATTACHABLE AND DETACHABLE PAINTER'S TOOL

CROSS-REFERENCE TO RELATED APPLICATIONS

This application claims benefits of a prior provision application No. 61/356,951 filed on Jun. 21, 2010.

BACKGROUND-FIELD OF INVENTION

This invention relates to adjustable painting tools that are used to paint, stain, dust, polish, strip, sand, clean, wipe off & apply chemicals (liquid and powder) to the surface area of objects comprising of bars, posts, poles, shafts, spindles, railings, and columns in addition to flat surfaces such as walls.

BACKGROUND-DESCRIPTION OF PRIOR ART

The popular method of painting, staining, dusting, polishing, striping, cleaning, wiping off & applying chemicals to the surface area of multisided objects is to use a standard brush that has a handle at one end and brush material pointing 180 degrees straight out of the opposite end of handle or using a standard paint roller that has a handle located 90 degree to the roller cover. With the current methods one is restricted to holding a painting tool at one angle which is limiting when you are painting a multisided object. Some painting tools have adjustable rollers to paint multisided object but they can't paint walls. These adjustable rollers have to be tighten really tight with a nut and bolt and still when pressing hard multisided object but they can't paint walls. These adjustable rollers have to be tighten really tight with a nut and bolt and still when pressing hard against a painting object the nut and bolt will loosen and the painting tool will rotate or it is very difficult to unloose the nut and retighten the nut to make adjustments to the painting tool causing the need to use pliers or screw driver to get the nut and bolt to be more secure. Some are not detachably adjusted which limits the ability to use different painting heads on the same handle. The ones that are detachably adjusted have too many holes to align with bosses. In addition, current painting applicators don't allow the attachment of painting applicators on both ends of a handle. Therefore there was a need for my invention to provide a painting applicator to allow quick adjustment with a secure locking position and that has a detachable and attachable painting applicator head that is positioned at different ends of the handle and that could have multiple types of painting applicators and painter's tool heads attached to the handle.

Prior art multi-roller devices have attempted to provide a solution to one or more problems envisioned herby include (U.S. Pat. No. 4,089,082) which discloses an adjustable roller but does not allow for quick adjustment with a secure locking position that has a detachable and attachable painting applicator head that is positioned at different ends of the handle and that allows for multiple type of painting applicators and painter's tool heads attached to the handle. Nor does it have a polygon shape mating connection to prevent the paint head from rotating in relation to the handle.

U.S. Pat. No. 4,528,714 discloses an adjustable roller that is detachable but it has bosses attach to the handle base plate that must be removed from the holes in the roller base plate when selecting a roller cover position. My second preferred invention does not use bosses because they prevent one from turning the plate into position while the plates are still mated together. My handle has two holes instead of bosses and this allows the roller head to still be attached at the pivot holes with a bolt and rotate to the desired roller position without detaching the roller head first, but once in position another bolt is put through the roller head and handle positioning holes to lock the roller head into position. This alignment of holes with my invention instead of using bosses, allows for the roller head in my invention to be quickly positioned and locked into place without detaching the roller head from the handle. In another preferred design my invention has a polygon shape mating connection to prevent the paint head from rotating in relation to the handle.

U.S. Pat. No. 5,207,555 discloses a universal adjustable paint roller but unlike my invention does not have polygon shaped mating connection to prevent the roller head from moving in relation to the handle and the paint arm is not detachable and attachable.

U.S. Pat. No. 6,148,469 also discloses an adjustable roller but unlike my invention does not have polygon shaped mating connection to prevent the roller head from moving in relation to the handle and the paint arm is not detachable and attachable.

U.S. Pat. No. 7,213,294 B2 discloses an adjustable roller but unlike my invention does not have polygon shaped mating connection to prevent the roller head from moving in relation to the handle and the paint arm is not detachable and attachable.

Accordingly, in spite of the various efforts of the prior art, a need still exists for an improved device that is used to paint, stain, dust, polish, strip, sand, scrap, clean, wipe off & apply chemicals (liquid and powder) on the surface area of objects in a manner that is easy & quick, while at the same time the tool is adjusted to various rotated angles and locations and locked into position allowing the operator to have more flexibility.

SUMMARY

In accordance with the present invention, the "attachable & detachable painter's tool" mainly comprises a painter's tool attachment arm and handle with a rotate & lock mating shape coupling mechanism. The present invention novelty is that it allows the operator to attach one or multiple painting tools comprising roller covers, paint brushes, paint pads, foam applicators, scrappers, and wire brushes to one handle and rotate the painting tools to different angles and positions around the handle and securely lock them into the desired location using the rotate & lock mating shape coupling mechanism which is an improved connection method using mating male and female shapes to provide the painting tool with an anti-rotation secure connection to the handle. This connection prevents the tool from rotating even if there is a bolt and nut that is loosely tighten. The keyed mechanism allows for specific positioning of the painting arm in addition to the anti-rotation function. Then a painter can more effectively change the angle of their painting tools to allow them to more efficiently paint, stain, dust, polish, strip, sand, clean, wipe off & apply liquid and power chemicals to multiple painting objects.

OBJECTS AND ADVANTAGES

Accordingly, several objects and advantages of the "attachable & detachable painter's tool" described in my above patent are:
(a) to provide a better way to connect multiple painting tools to one handle;

(b) to provide a faster way to rotate and lock a painting tool after making positional adjustments to the painting tools attached to one handle;

(c) to provide a better locking mechanism, thru use of shape coupling, to prevent the painting tool from rotating during operation;

(d) to provide a more efficient way of painting, staining, dusting, polishing, striping, sanding, cleaning, wiping off or applying chemicals (liquid and powder) to objects comprising bars, posts, poles, shafts, spindles, railings, supports, walls and columns but not limiting to the aforementioned group of objects;

(e) to provide an easier way of painting, staining, dusting, polishing, striping, sanding, cleaning, wiping off or applying chemicals (liquid and powder) to objects comprising bars, posts, poles, shafts, spindles, railings, supports, walls and columns but not limiting to the aforementioned group of objects;

(f) to provide a simple way paint, stain, dust, polish, strip, sand, clean, wipe off & apply chemicals (liquid and powder) to multisided objects comprising bars, posts, poles, shafts, spindles, railings, supports, and columns but not limiting to the aforementioned group of objects;

(g) to provide a reduction in the number of people require to paint, stain, dust, polish, strip, sand, clean, wipe off & apply chemicals (liquid and powder) to multisided objects comprising bars, posts, poles, shafts, spindles, railings, supports, and columns but not limiting to the aforementioned group of objects;

(h) to provide a better way to paint, stain, dust, polish, strip, sand, clean, wipe off & apply chemicals (liquid and powder) to multisided objects comprising bars, posts, poles, shafts, spindles, railings, supports, and columns but not limiting to the aforementioned group of objects;

Further objectives and advantages of my invention will become apparent from a consideration of the drawings and ensuing description.

DRAWING FIGURES

In accordance with the present invention the "attachable & detachable painter's tool" mainly comprises a painter's tool attachment arm and a rotate & lock mating shape coupling mechanism.

FIG. 1A) shows the "attachable & detachable painter's tool" with a spring loaded polygon shaped connection means for adjusting a roller cover at one end and a handle to hold onto at the other end.

FIG. 1B) shows the "attachable & detachable painter's tool" with a polygon star shaped mating connection with a roller at both ends of the handle.

FIG. 2) shows the "attachable & detachable painter's tool" dual roller covers in the round bar, pipe or spindle painting position.

FIG. 3) shows the "attachable & detachable painter's tool" dual roller covers in the square post or spindle painting position.

FIG. 4) shows the "attachable & detachable painter's tool" single roller cover for painting walls and flat surfaces position.

Figure 5:
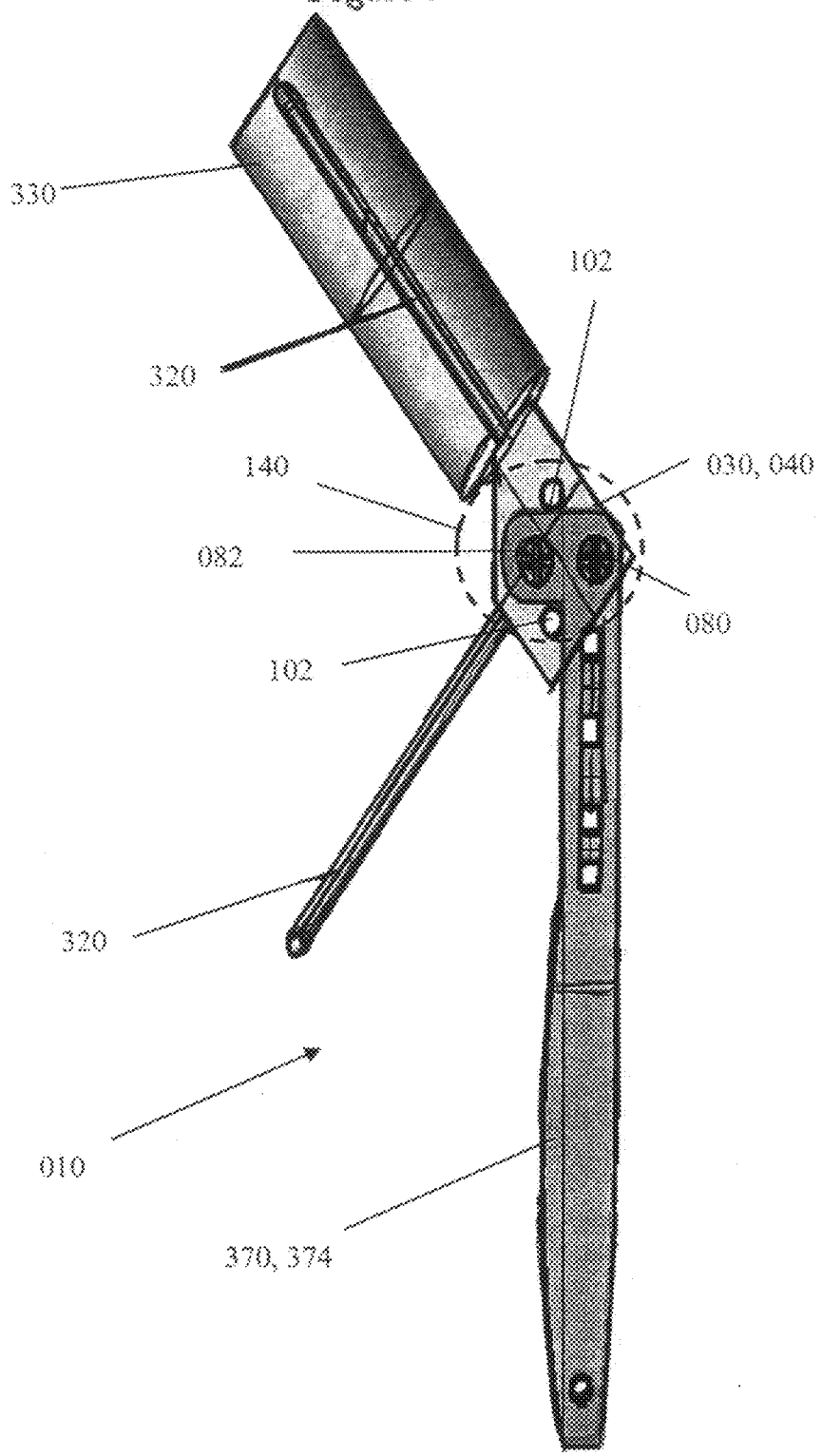
Figure 6:
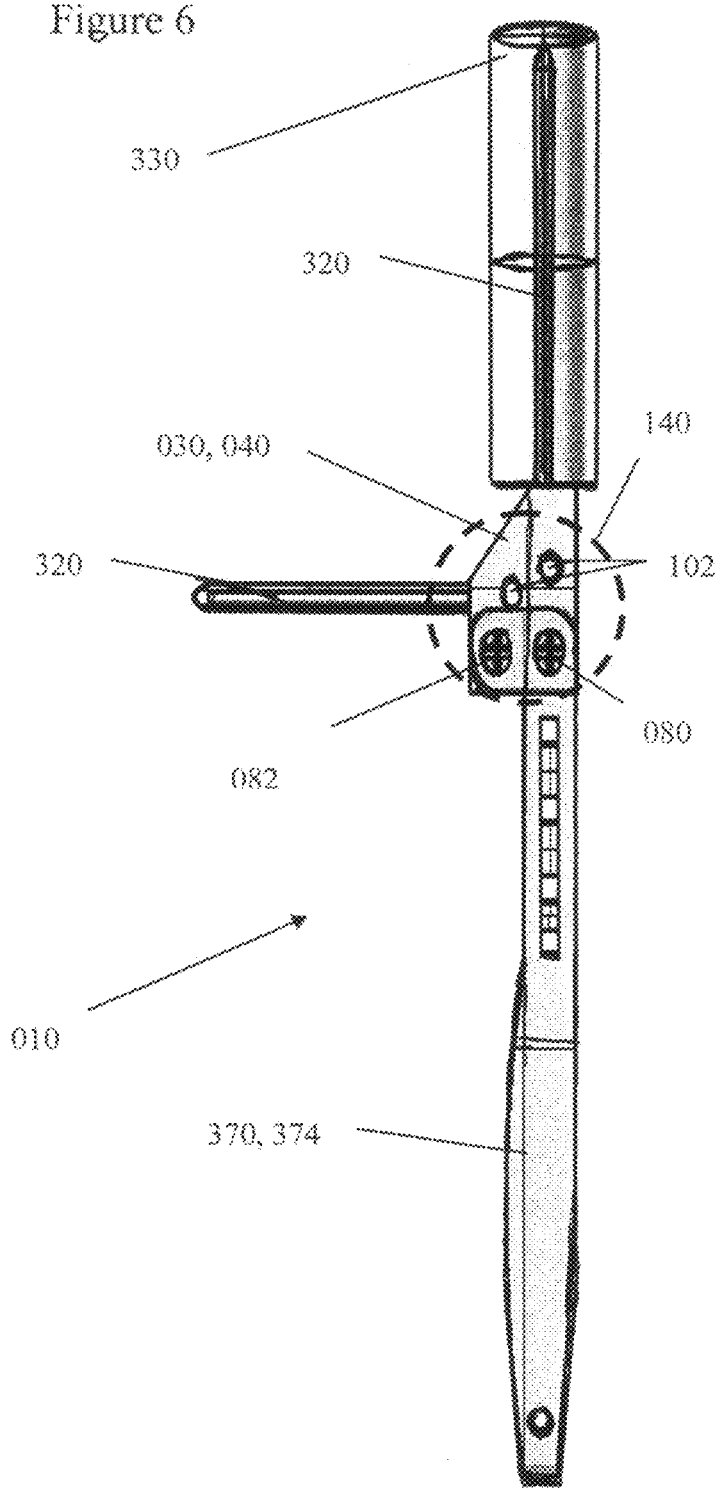

FIG. 5) shows the "attachable & detachable painter's tool" single roller covers in the round bar, pipe or spindle painting position FIG. 6) the "attachable & detachable painter's tool" single roller covers in the square post or spindle painting position.

Figure 7:
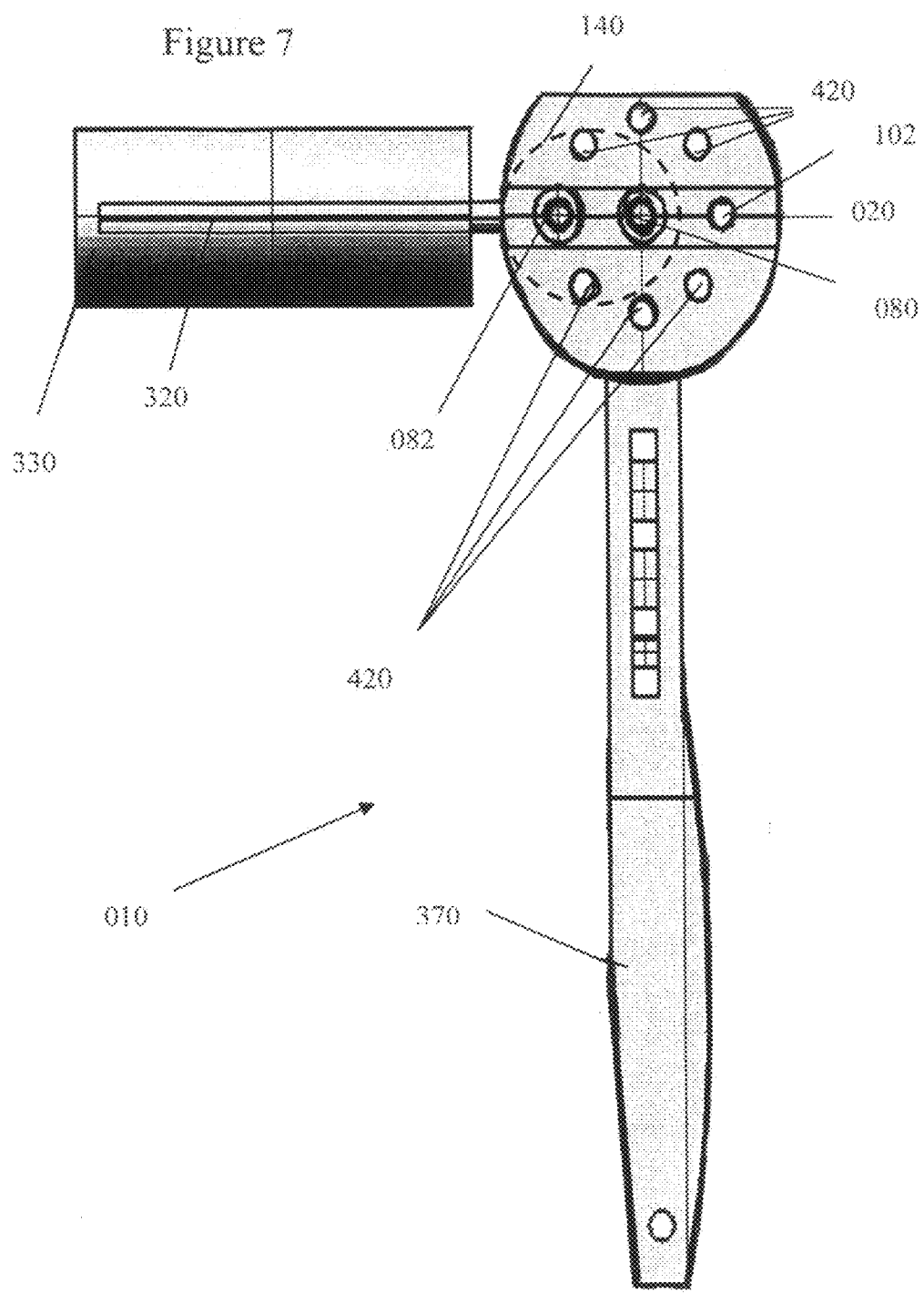

FIG. 7) shows the "attachable & detachable painter's tool" with handle 360 degree painting arm pivot positions with single roller cover.

Figure 8:
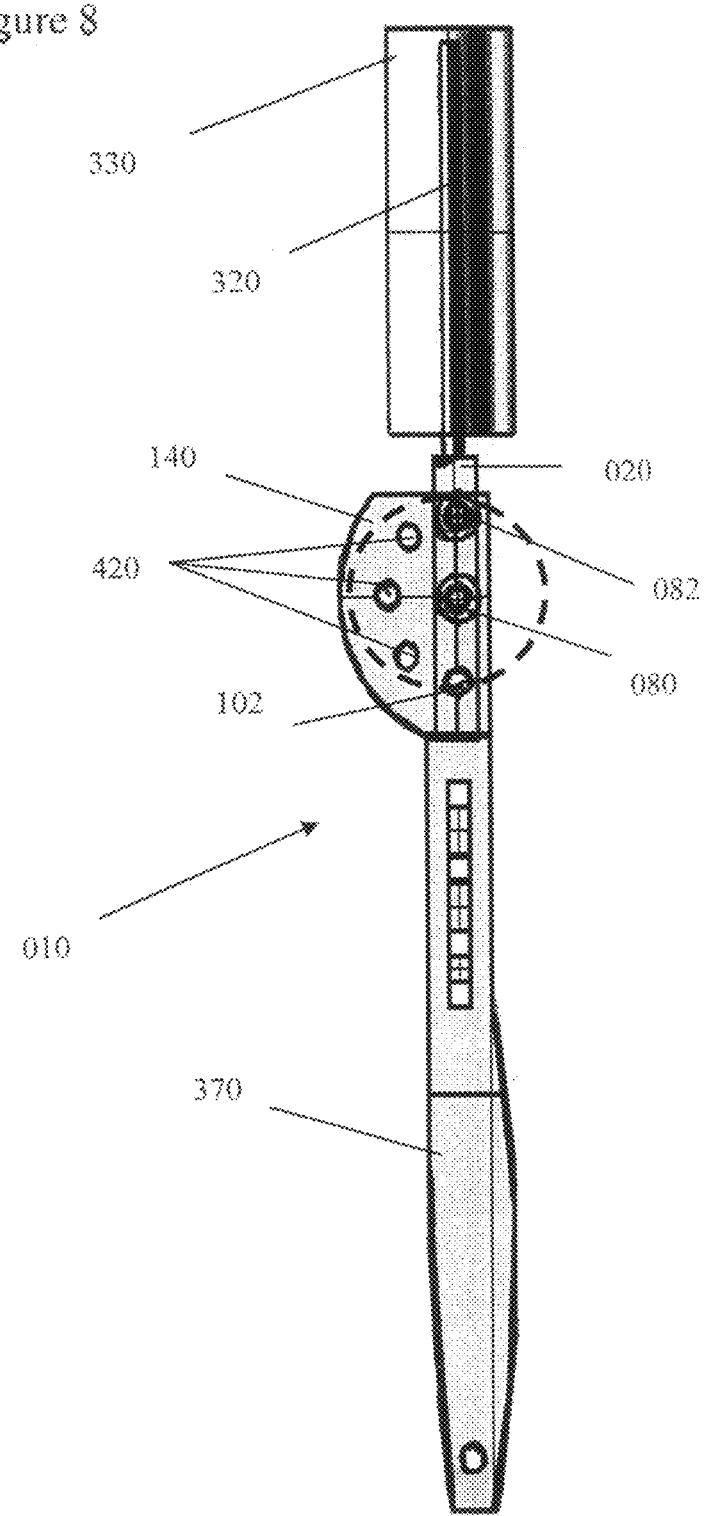

FIG. 8) shows the "attachable & detachable painter's tool" with handle 180 degree painting arm pivot positions with single roller cover.

Figure 9:
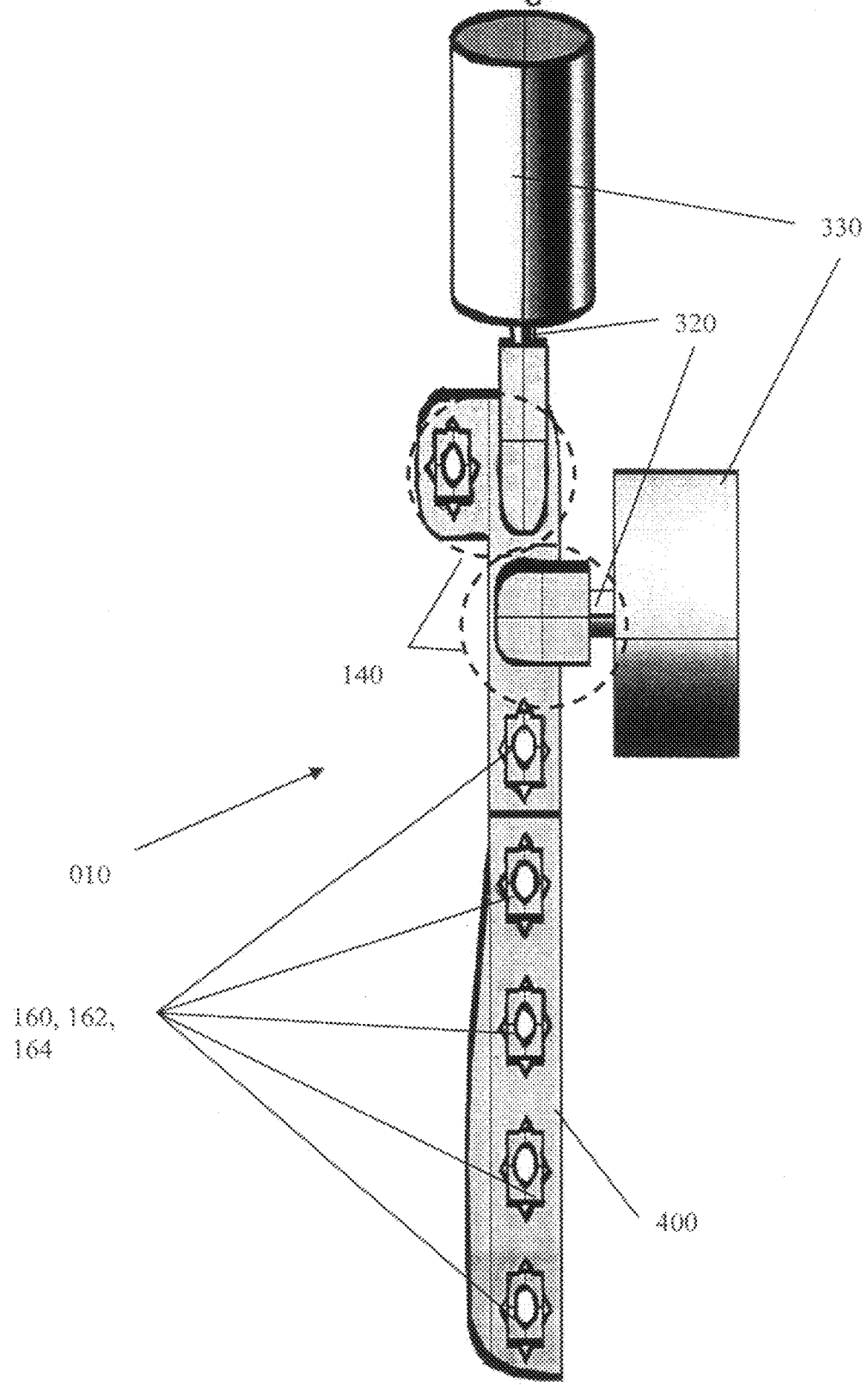

FIG. 9) shows the "attachable & detachable painter's tool" with star shaped male and female rotate & lock mating shape coupling mechanism with a pair of roller covers that is placed around a handle in several mating locations.

Figure 10:
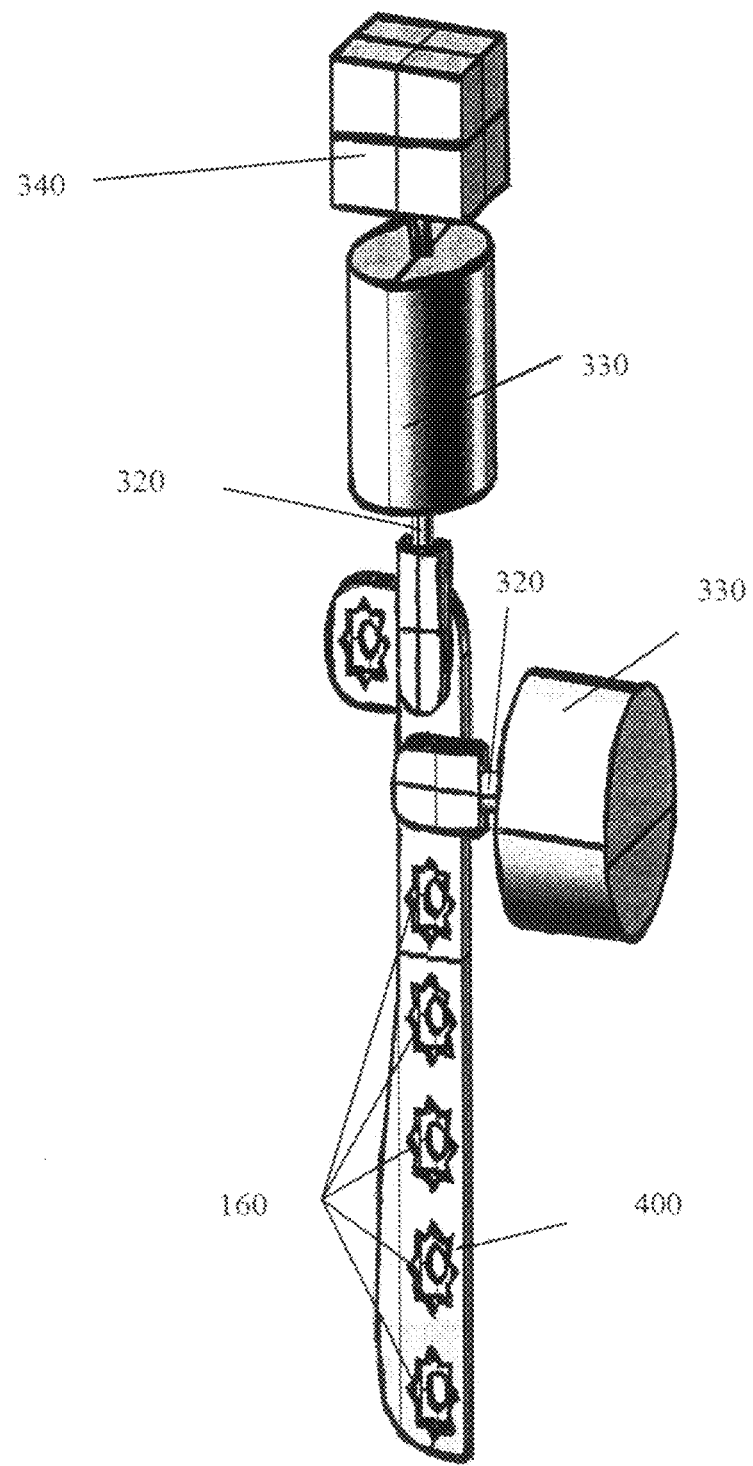

FIG. 10) shows the "attachable & detachable painter's tool" with star shaped male and female rotate & lock mating shape coupling mechanism with a pair of roller covers that has a square foam pad attached at it's end.

Figure 11:
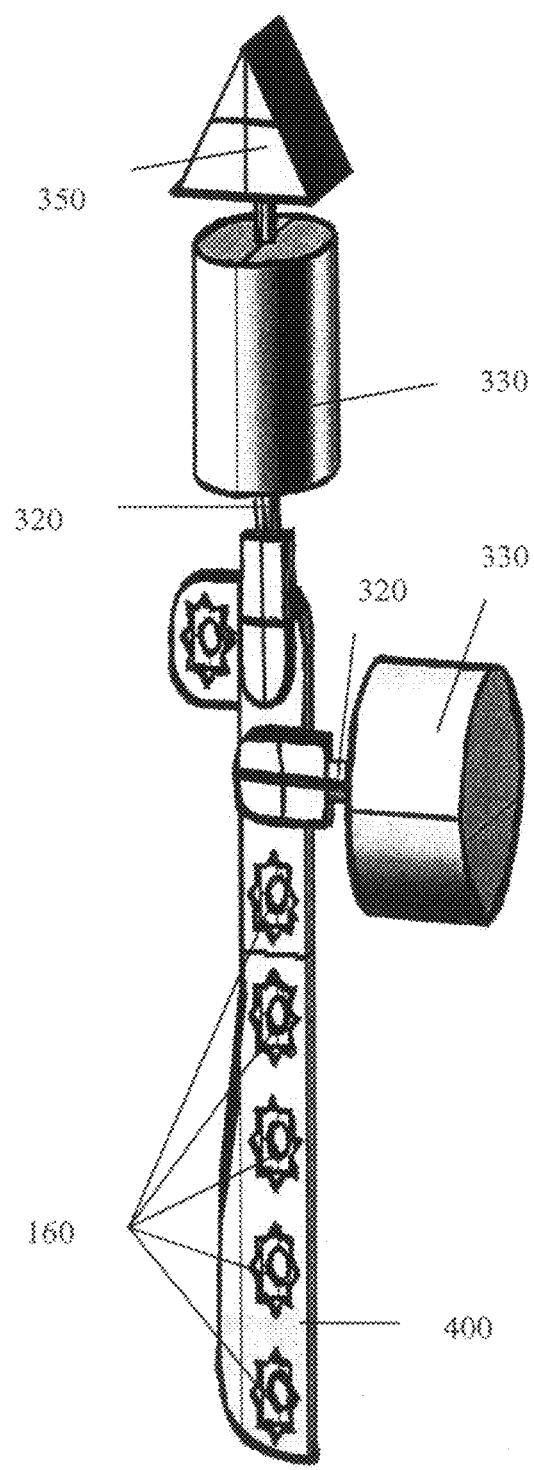

FIG. 11) shows the "attachable & detachable painter's tool" with star shaped male and female rotate & lock mating shape coupling mechanism with a pair of roller covers that has a triangle foam pad attached at it's end.

Figure 12:
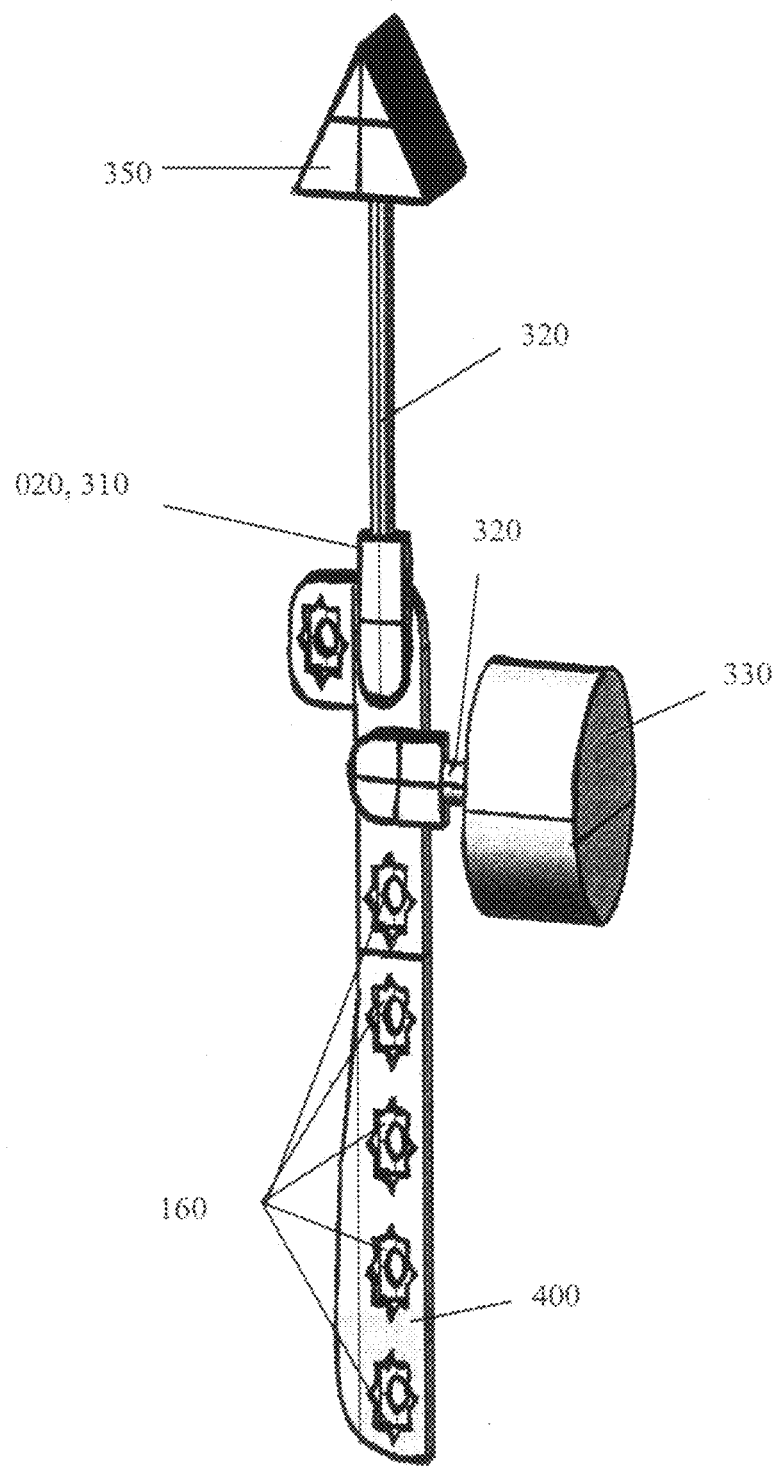

FIG. 12) shows the "attachable & detachable painter's tool" with star shaped male and female rotate & lock mating shape coupling mechanism with one roller cover and one triangle foam pad attachment.

Figure 13:
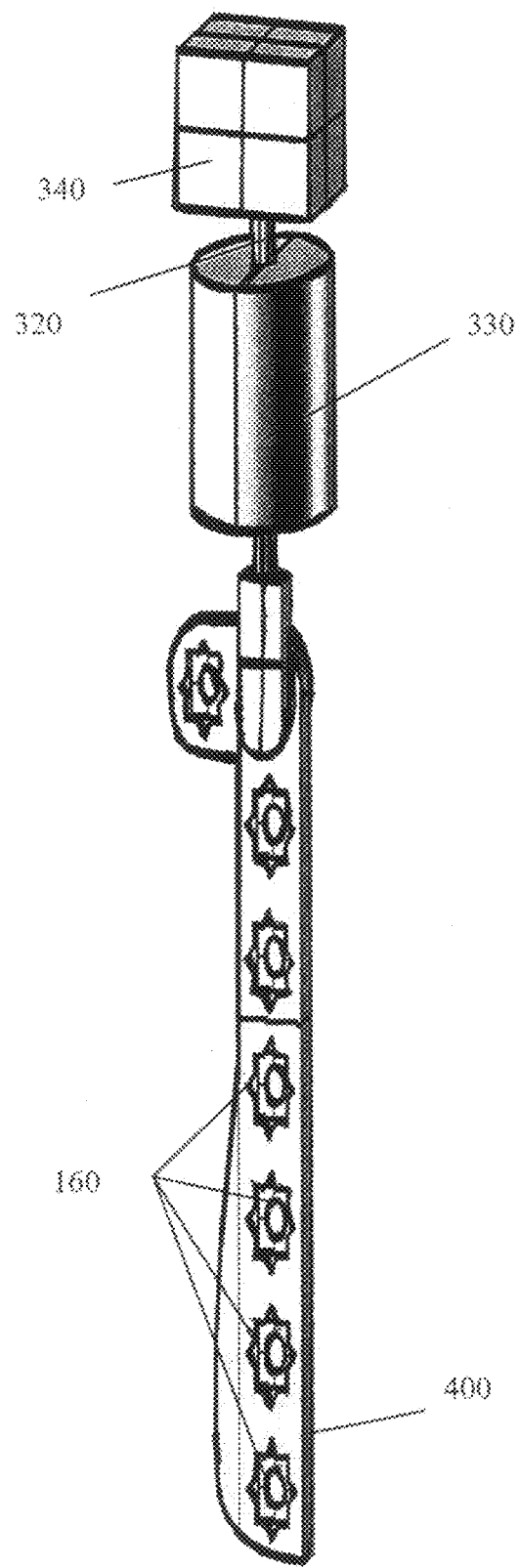

FIG. 13) shows the "attachable & detachable painter's tool" with star shaped male and female rotate & lock mating shape coupling mechanism with one roller cover and a square foam pad attached at it's end.

Figure 14:
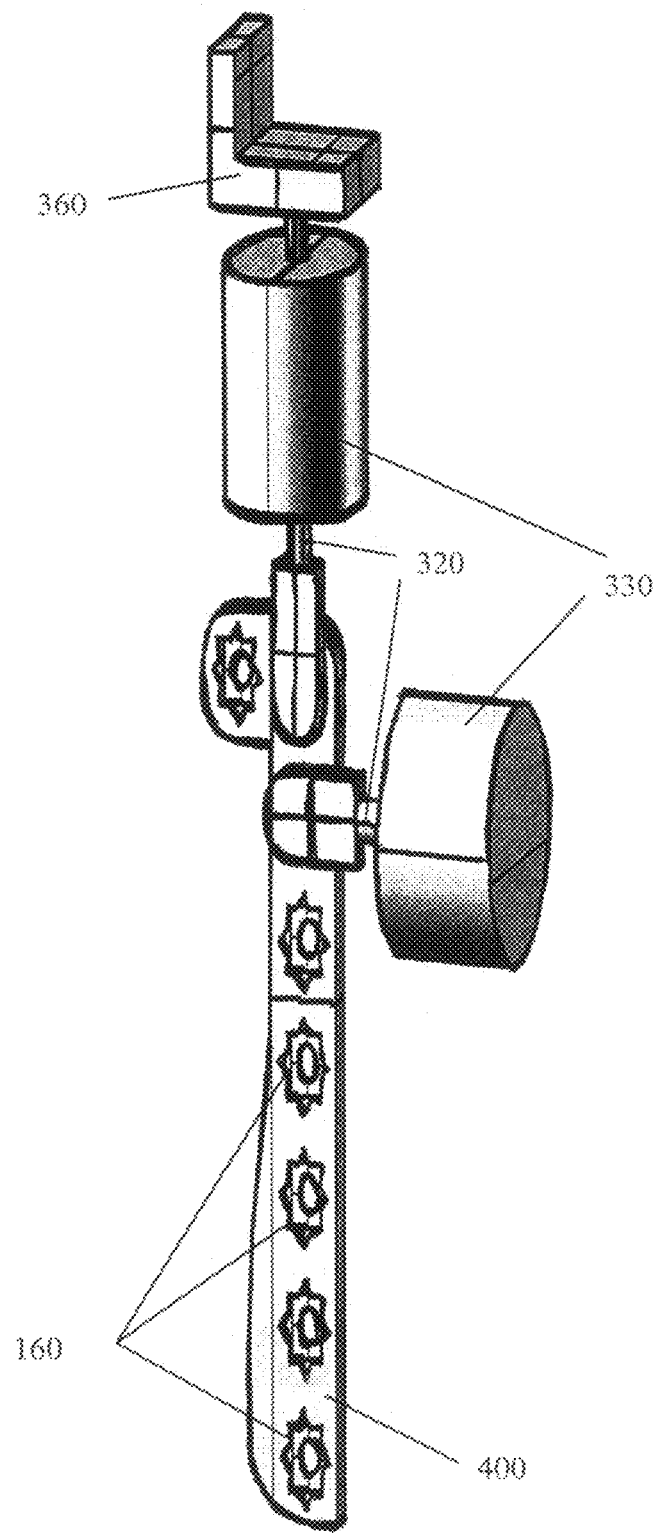

FIG. 14) shows the "attachable & detachable painter's tool" with star shaped male and female rotate & lock mating shape coupling mechanism with a pair of roller covers and one cover having an L-shaped foam pad attached at it's end.

Figure 15:
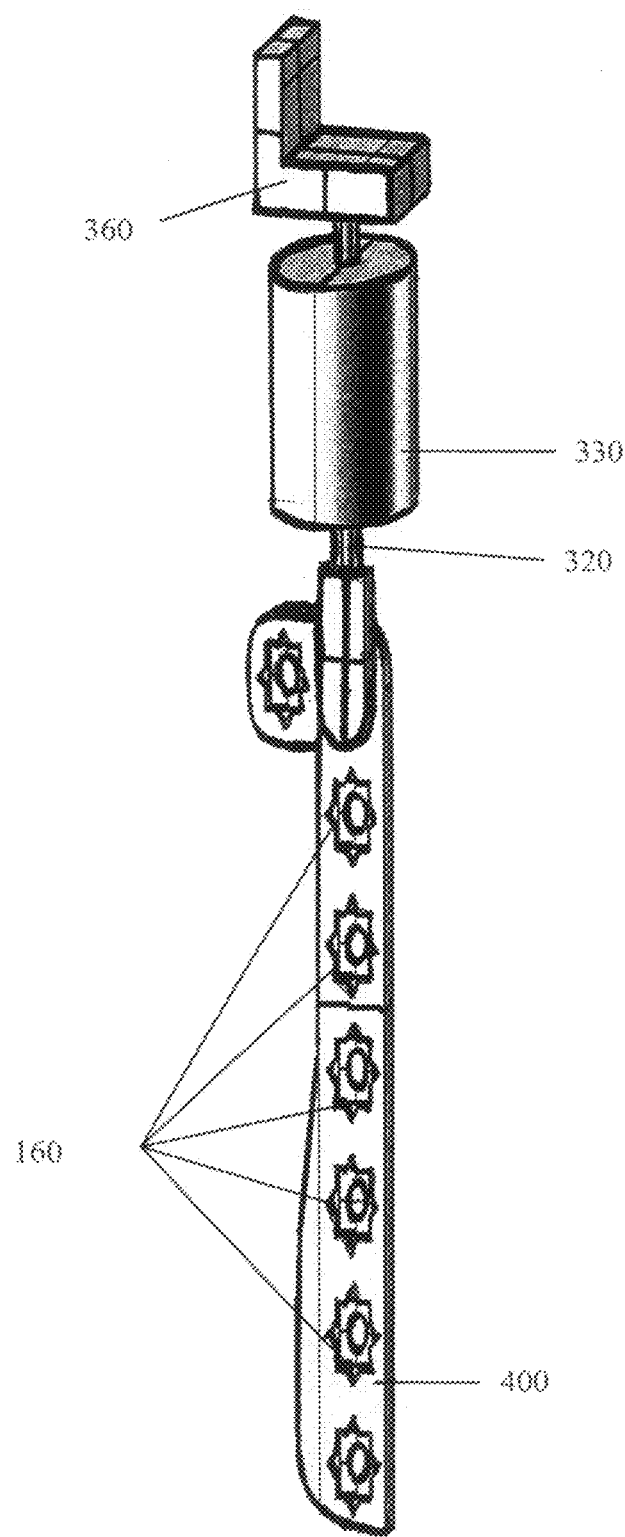

FIG. 15) shows the "attachable & detachable painter's tool" with star shaped male and female rotate & lock mating shape coupling mechanism with one roller cover and an L-shaped foam pad attached at it's end.

Figure 16:
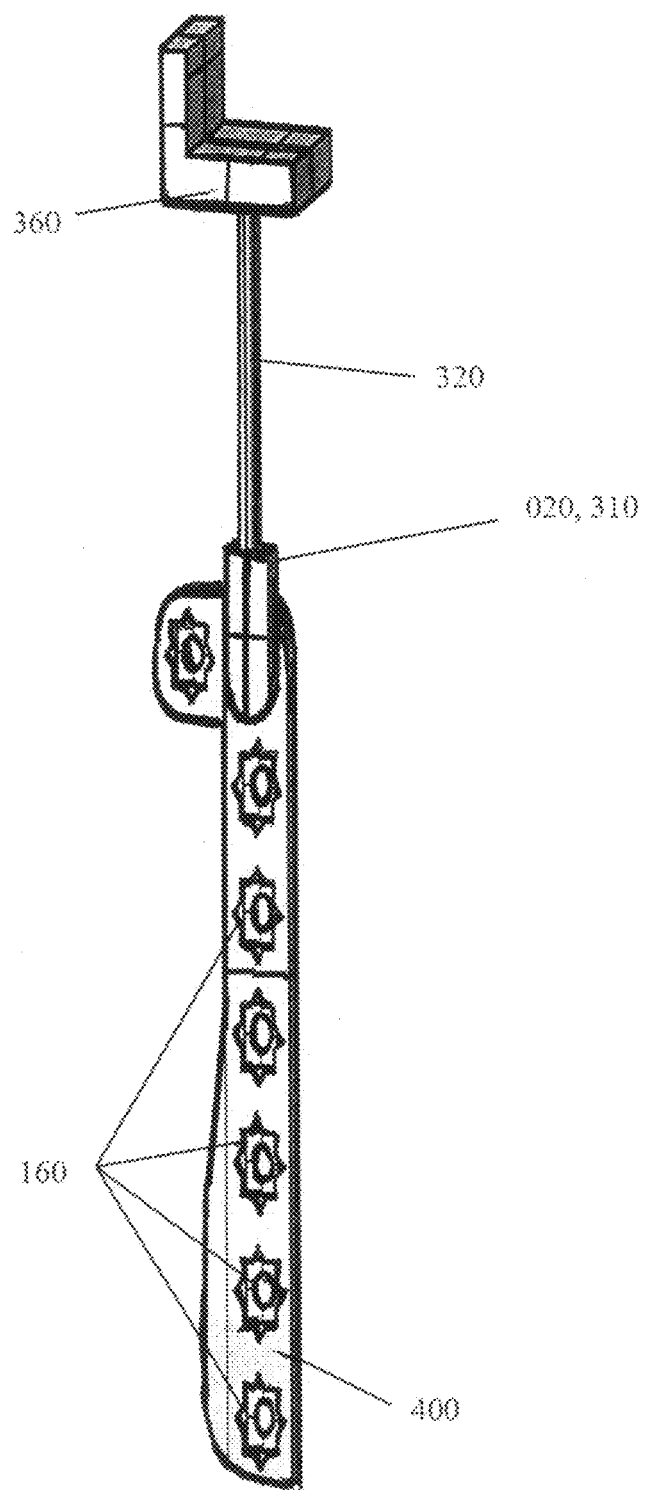

FIG. 16) shows the "attachable & detachable painter's tool" with star shaped male and female rotate & lock mating shape coupling mechanism with an L-shaped foam pad attached.

Figure 17:
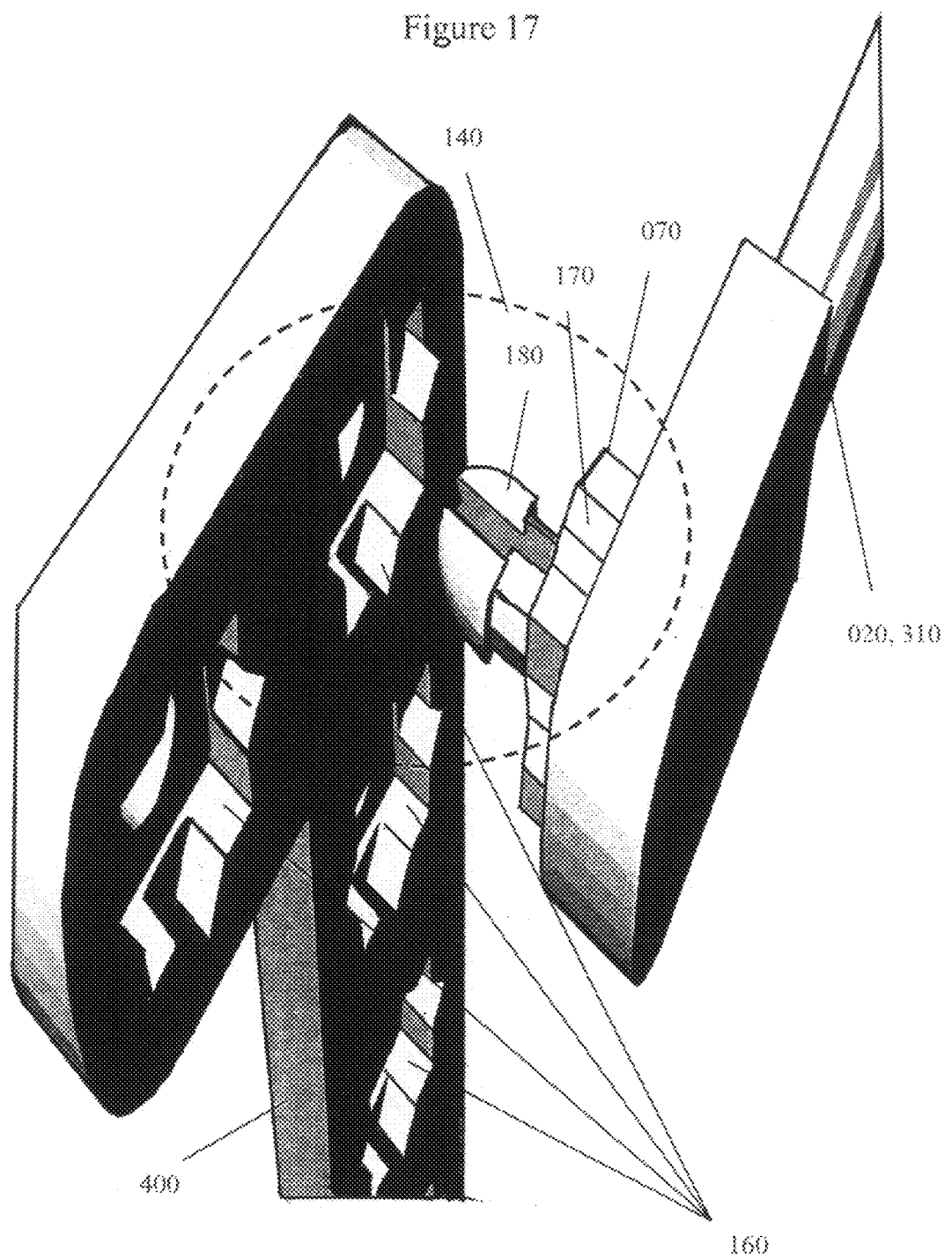

FIG. 17) shows the "attachable & detachable painter's tool" with star shaped male and female rotate & lock mating shape coupling mechanism with a painting arm having a built in detachable and attachable clip to secure to handle.

Figure 18:
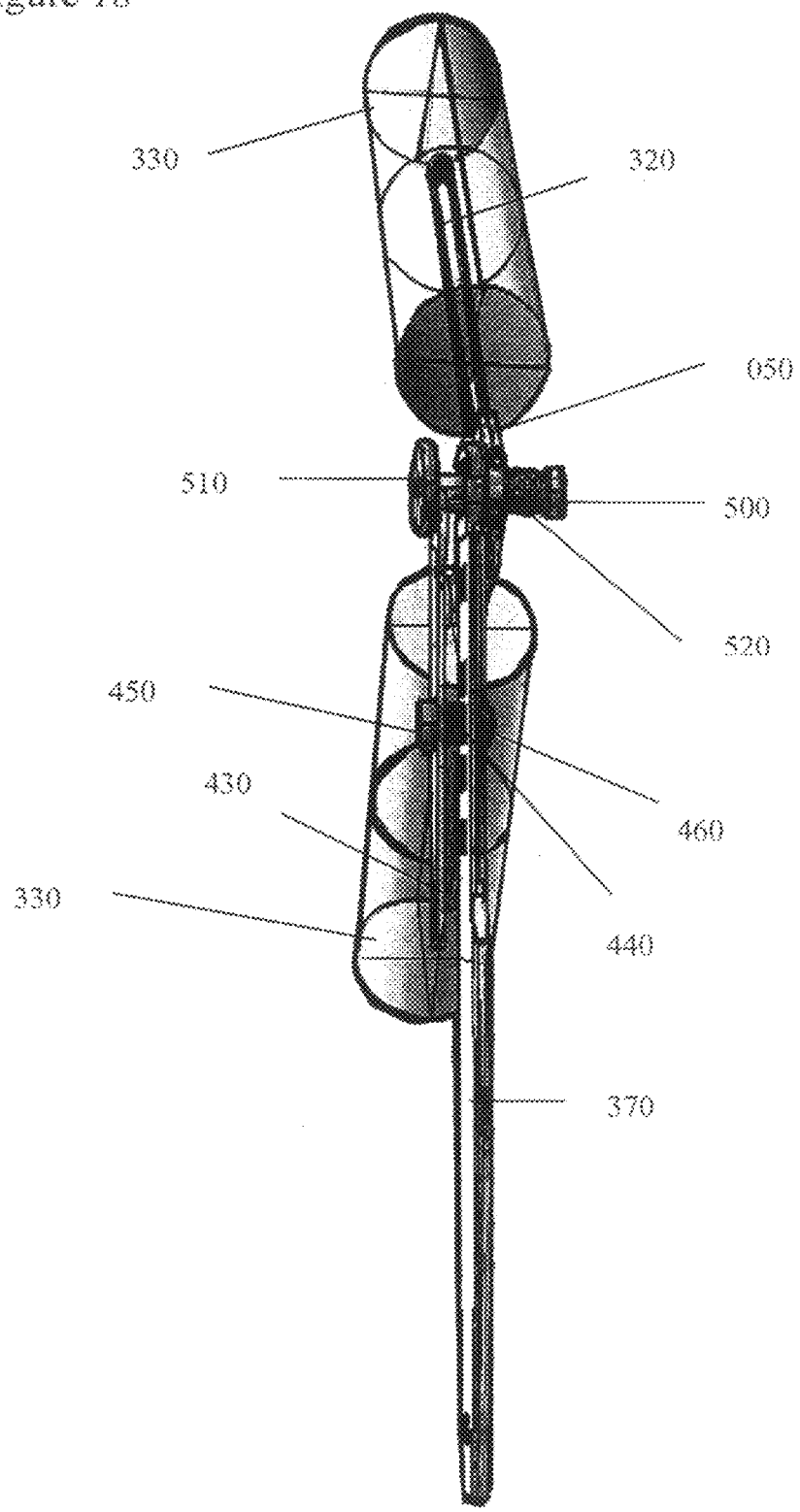

FIG. 18) shows the "attachable & detachable painter's tool" with star shaped male and female rotate & lock mating shape coupling mechanism that is spring engaged and disengaged by a lever and pin.

Figure 19:
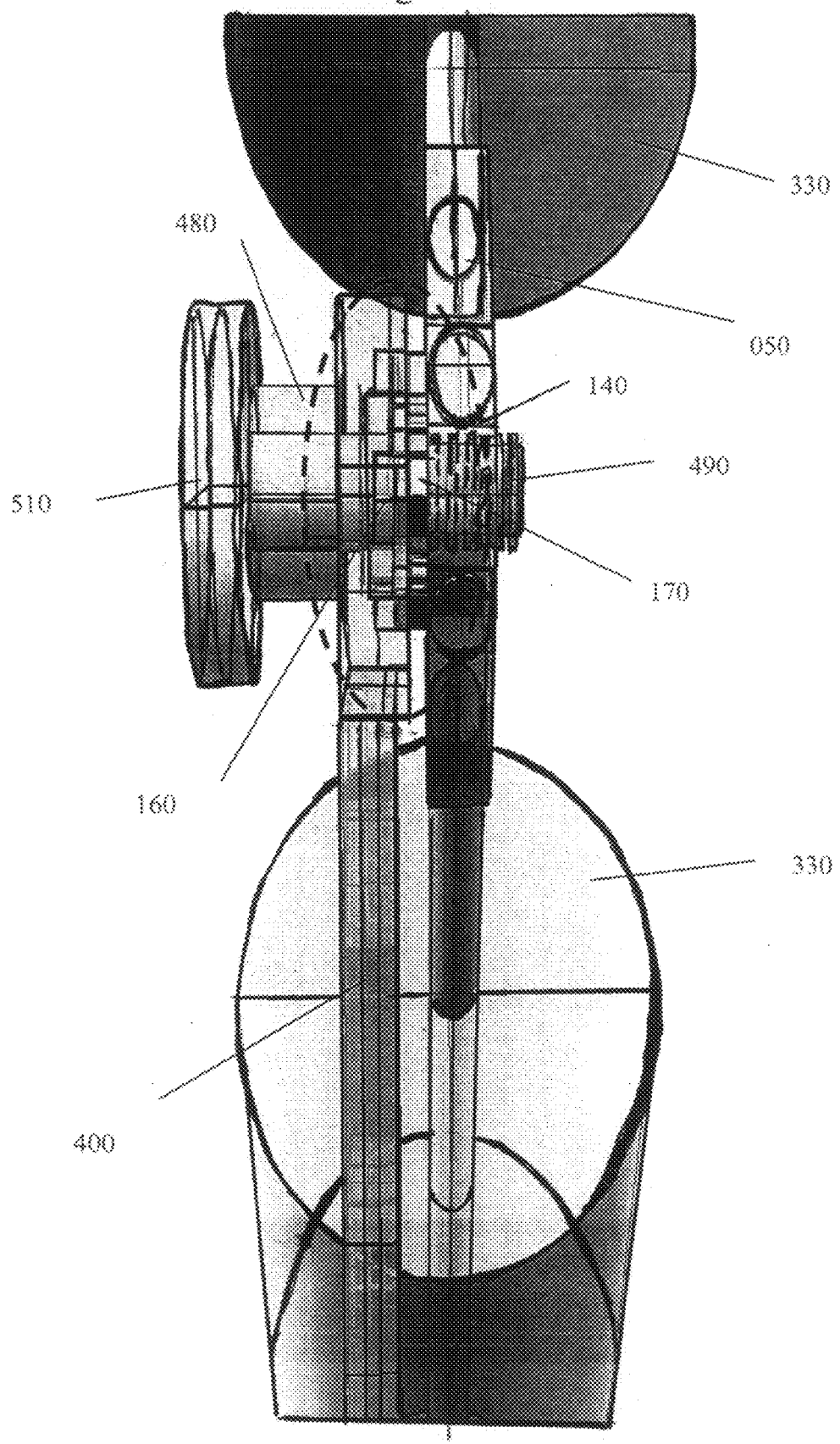

FIG. 19) shows the "attachable & detachable painter's tool" with star shaped male and female rotate & lock mating shape coupling mechanism that is engaged and disengaged by a threaded bolt.

Figure 20:
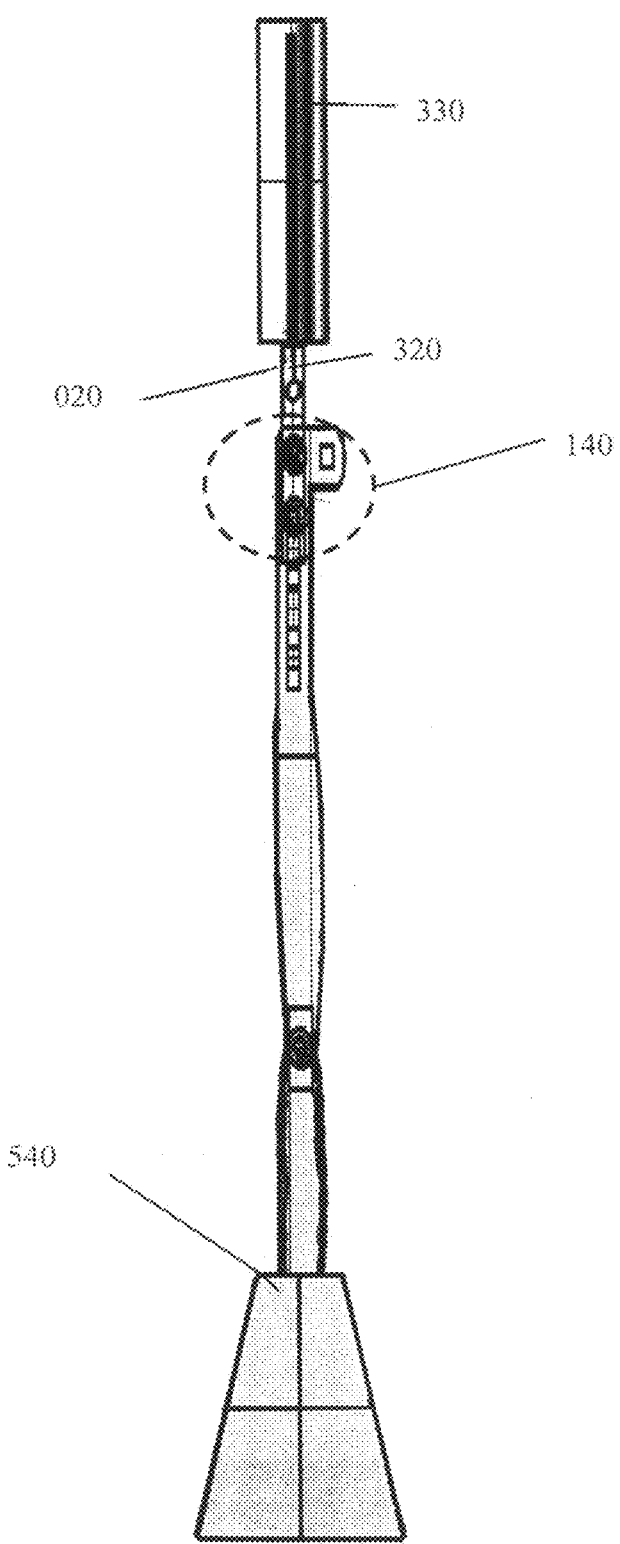

FIG. 20) shows the "attachable & detachable painter's tool" how other painting tools is attached showing a roller cover at one end and a paint scraping putty knife at the other end.

Figure 21:
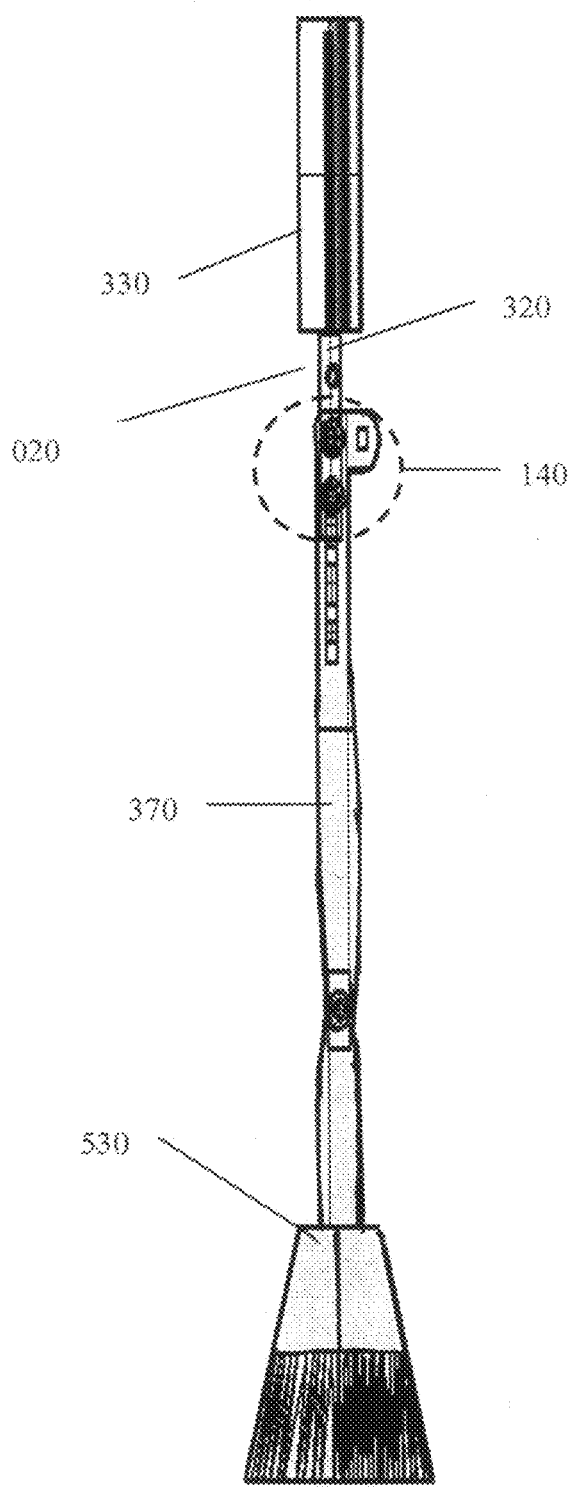

FIG. 21) shows the "attachable & detachable painter's tool" how other painting tools is attached showing a roller cover at one end and a paint brush at the other end.

Figure 22:
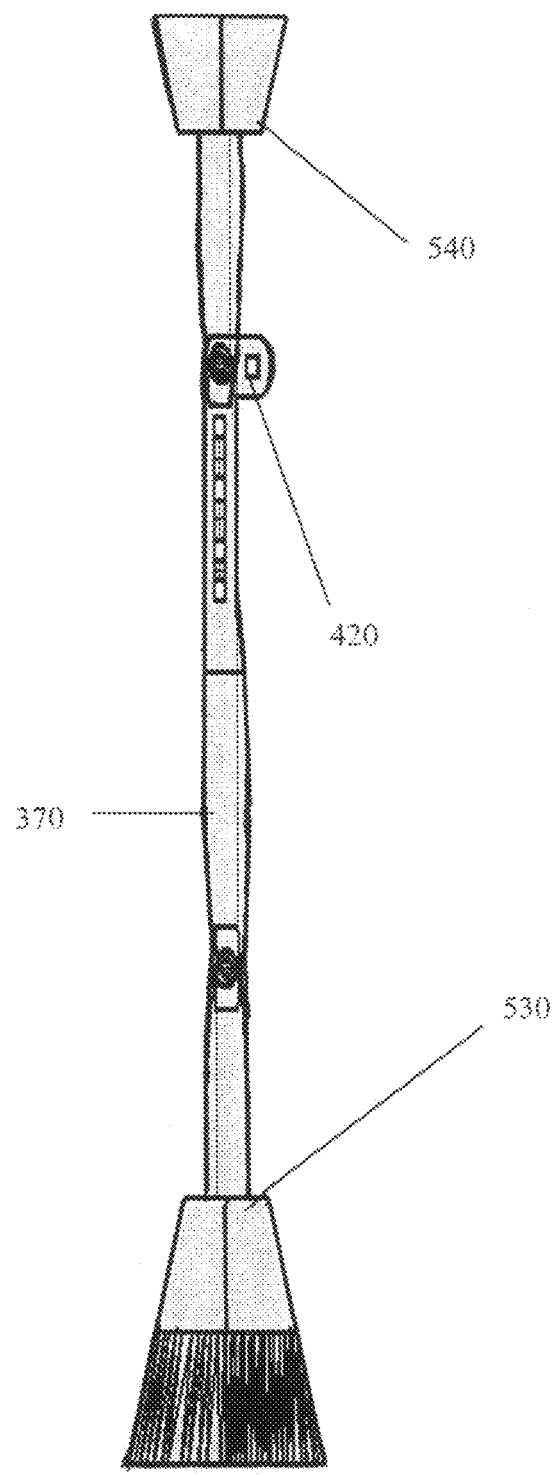

FIG. 22) shows the "attachable & detachable painter's tool" how other painting tools is attached showing a paint scraping putty knife at one end and a paint brush at the other end.

Figure 23:
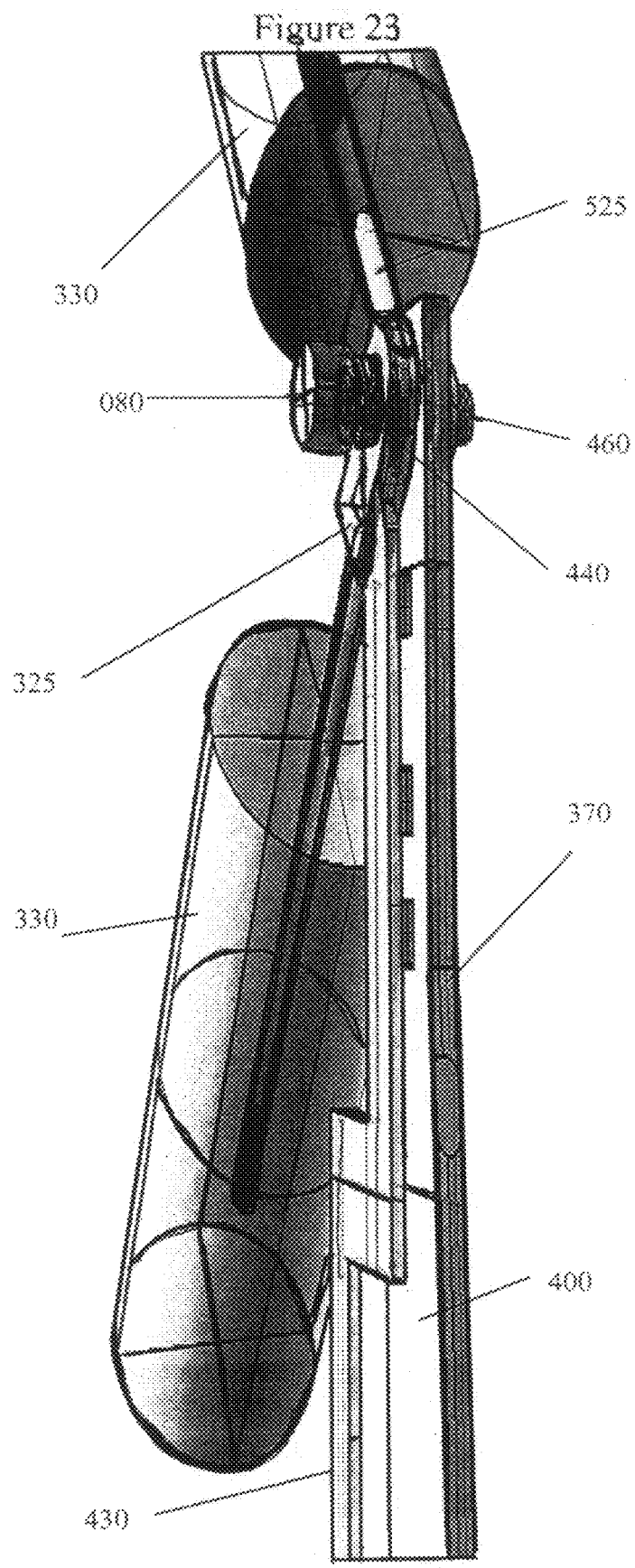

FIG. 23) shows the "attachable & detachable painter's tool" in the opened position with a spring loaded dual roller set with the lever controlling one roller cover and the other roller cover permanent.

Figure 24:
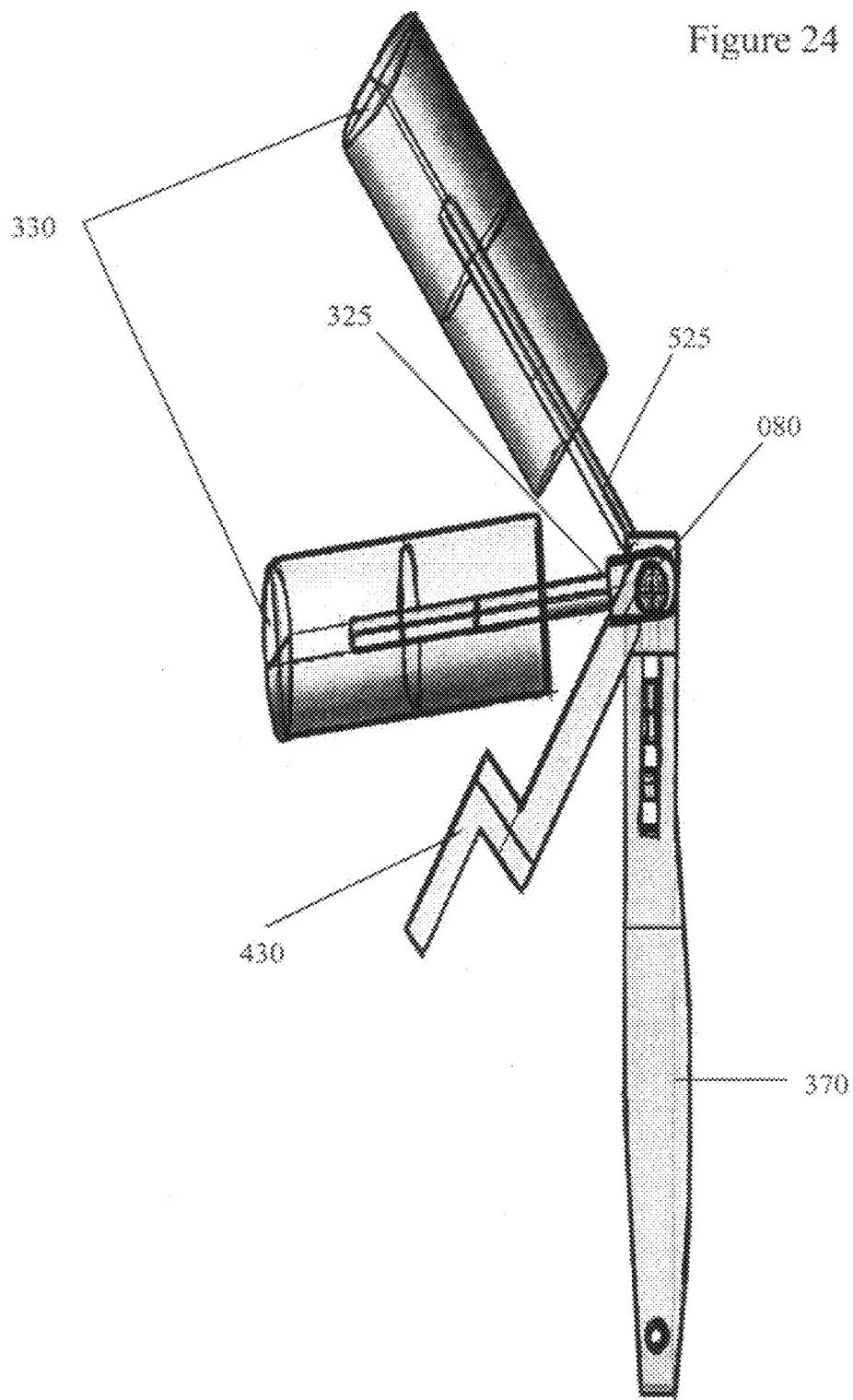

FIG. 24) shows the "attachable & detachable painter's tool" in the closed position with a spring loaded dual roller set with the lever controlling one roller cover and the other roller cover permanent.

Figure 25:
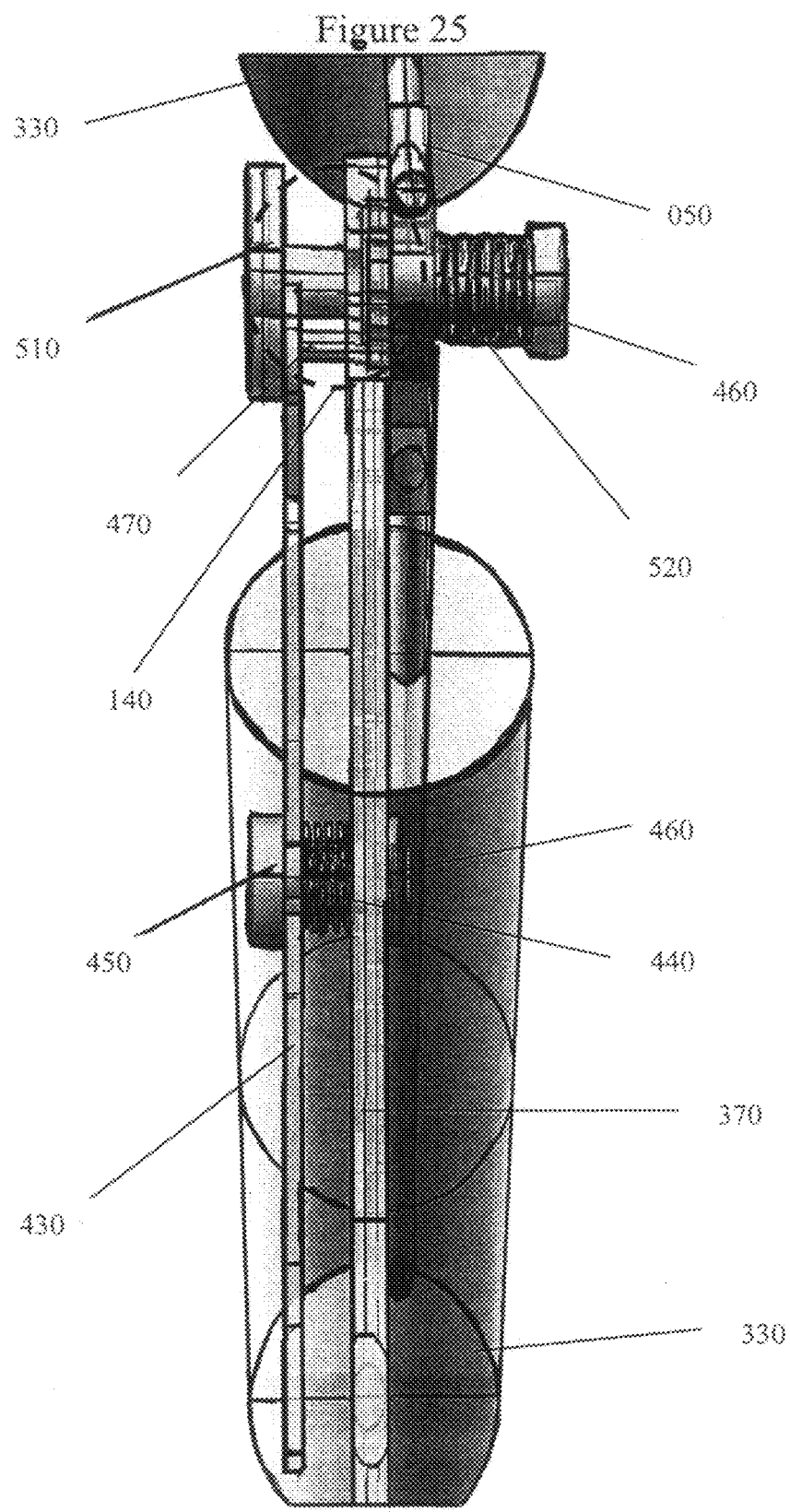

FIG. 25) shows the back view of the "attachable & detachable painter's tool" with star shaped male and female rotate & lock mating shape coupling mechanism that is spring engaged and disengaged by a lever and pin.

Figure 26:
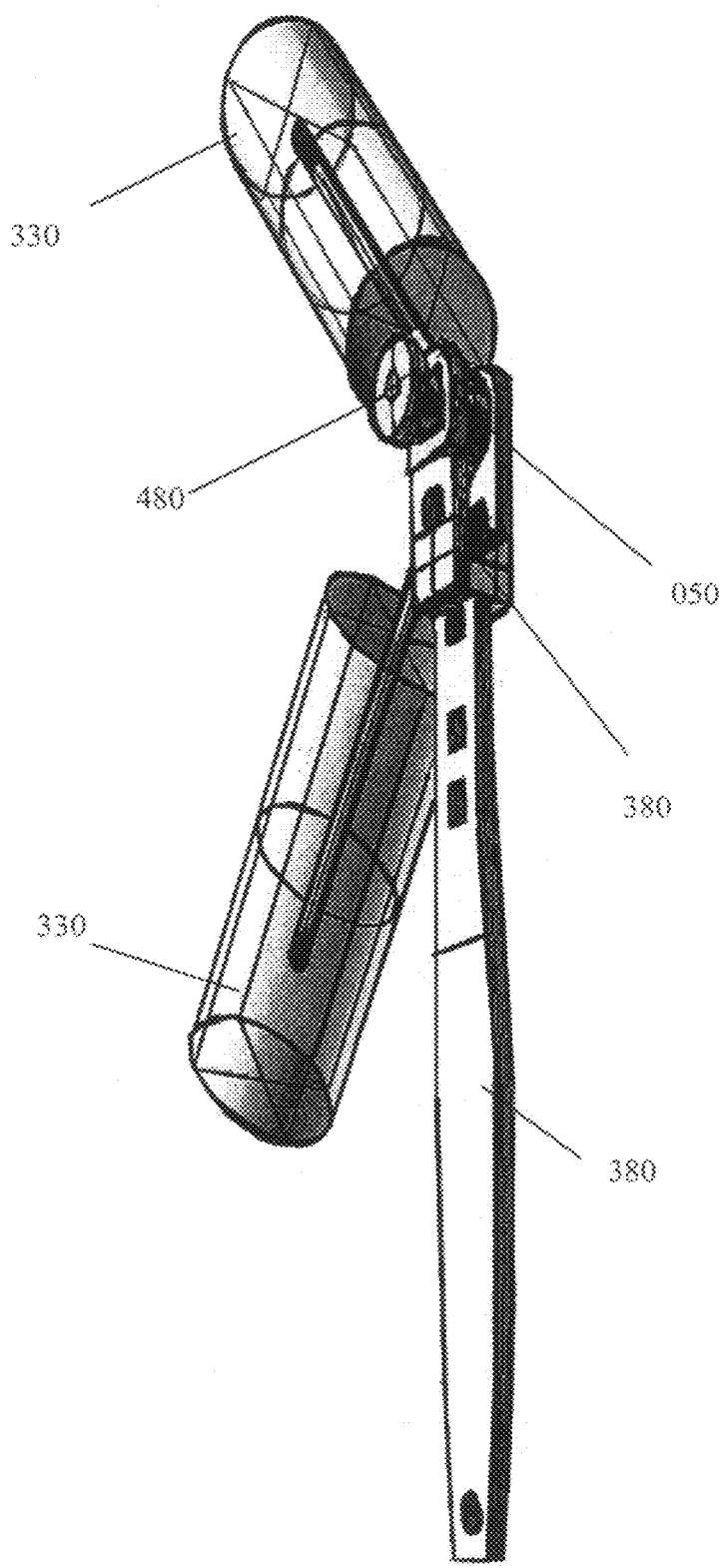

FIG. 26) shows the "attachable & detachable painter's tool" with star shaped male and female rotate & lock mating shape coupling mechanism that is engaged and disengaged by a threaded bolt attached to a fork shaped handle.

Figure 27:
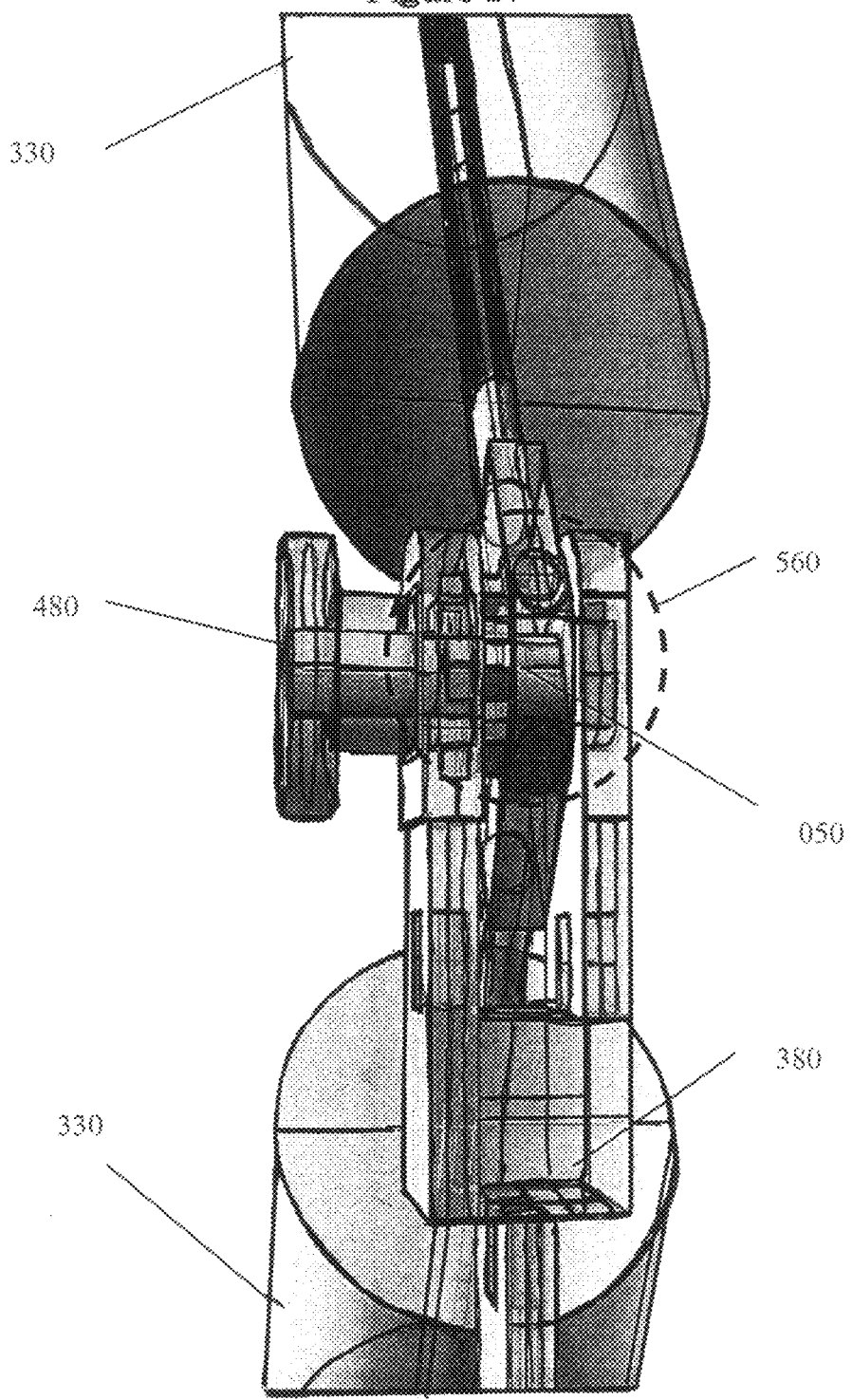

FIG. 27) shows a close-up view of the "attachable & detachable painter's tool" with star shaped male and female rotate & lock mating shape coupling mechanism that is disengaged by a threaded bolt attached to a fork shaped handle.

Figure 28:
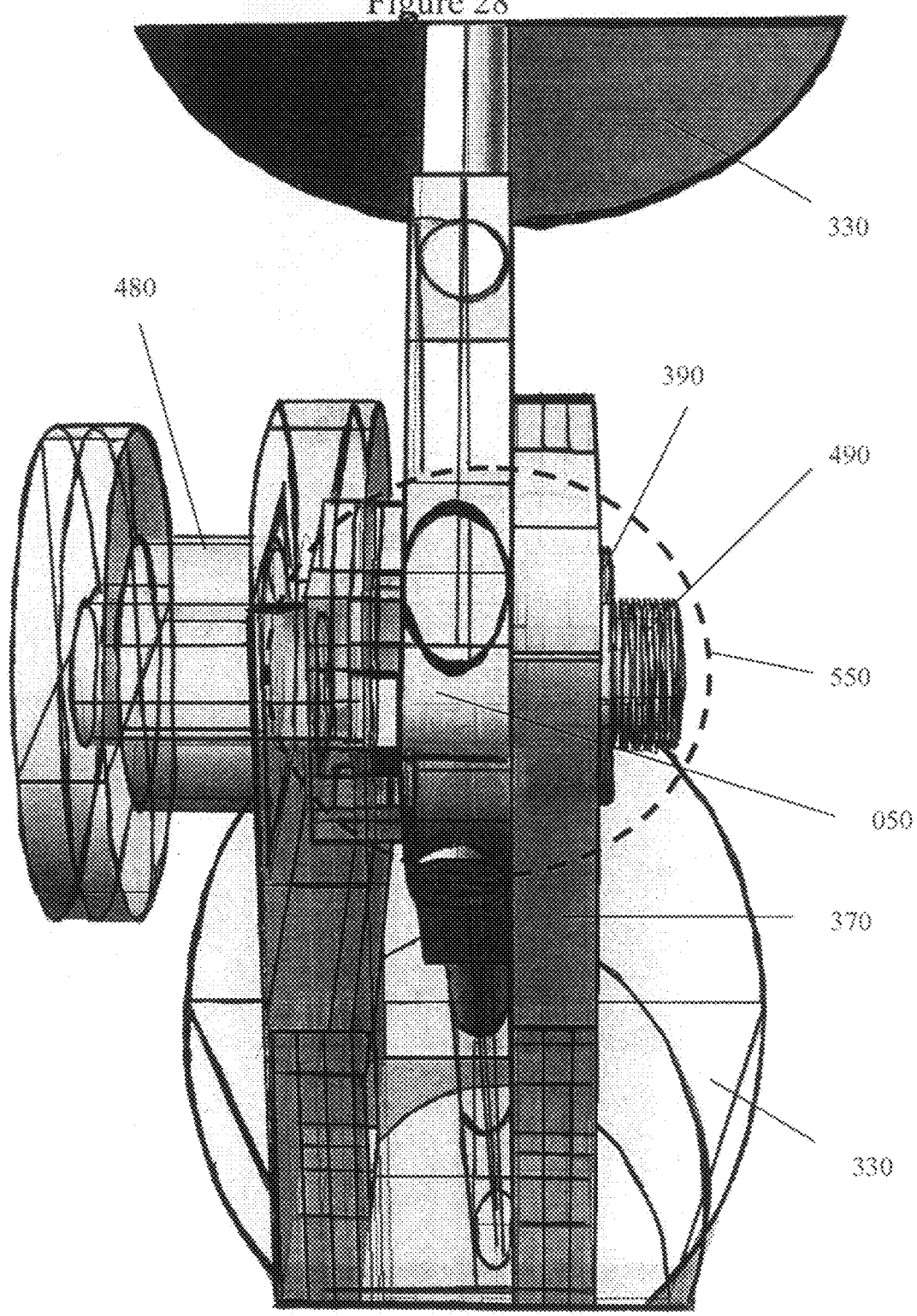

FIG. 28) shows a close-up view of the "attachable & detachable painter's tool" with star shaped male and female rotate & lock mating shape coupling mechanism that is engaged by a threaded bolt attached to a fork shaped handle.

Figure 29:
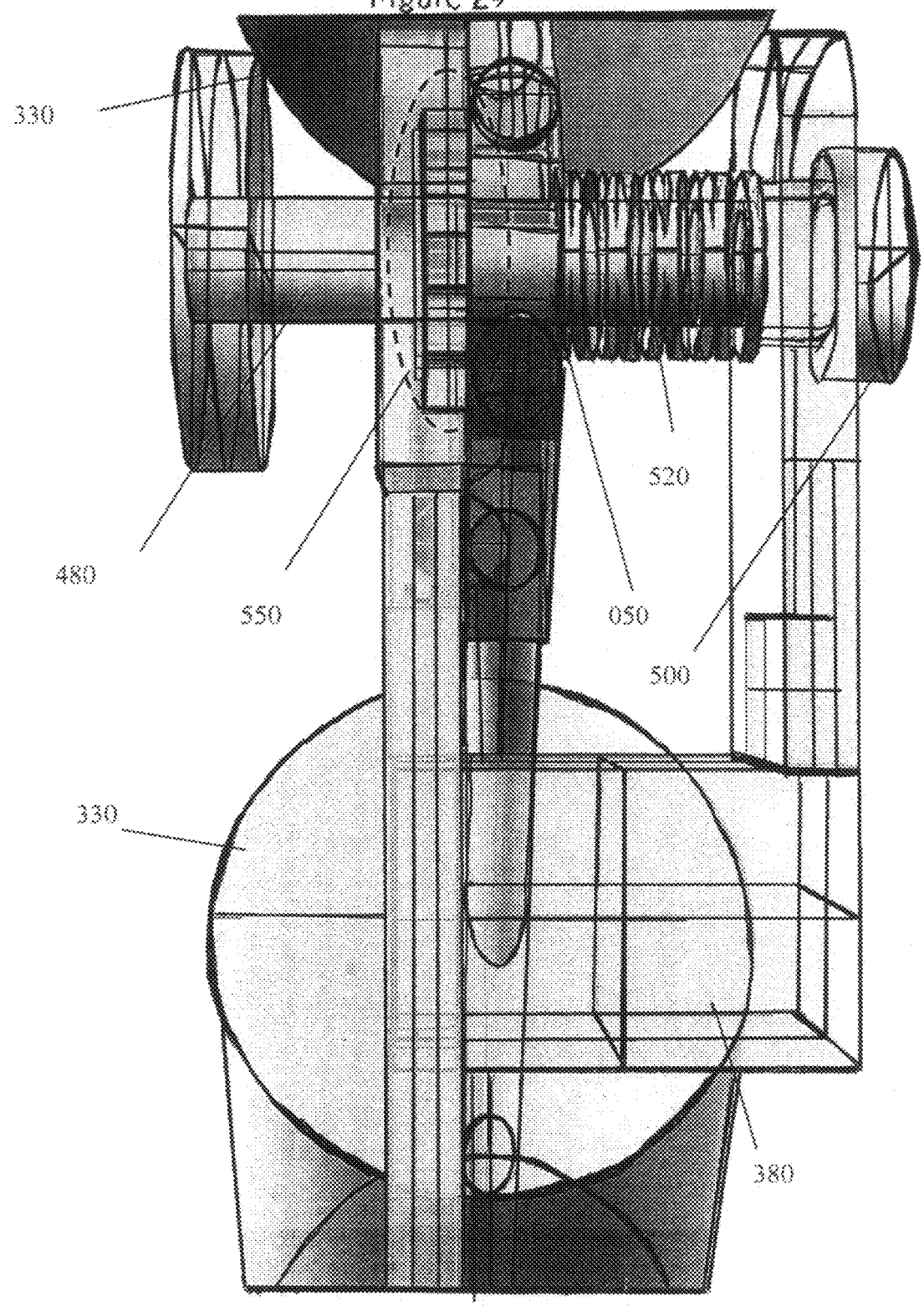

FIG. 29) shows a close-up view of the "attachable & detachable painter's tool" with star shaped male and female rotate & lock mating shape coupling mechanism that is engaged by a spring loaded bolt attached to a fork shaped handle.

Figure 30:
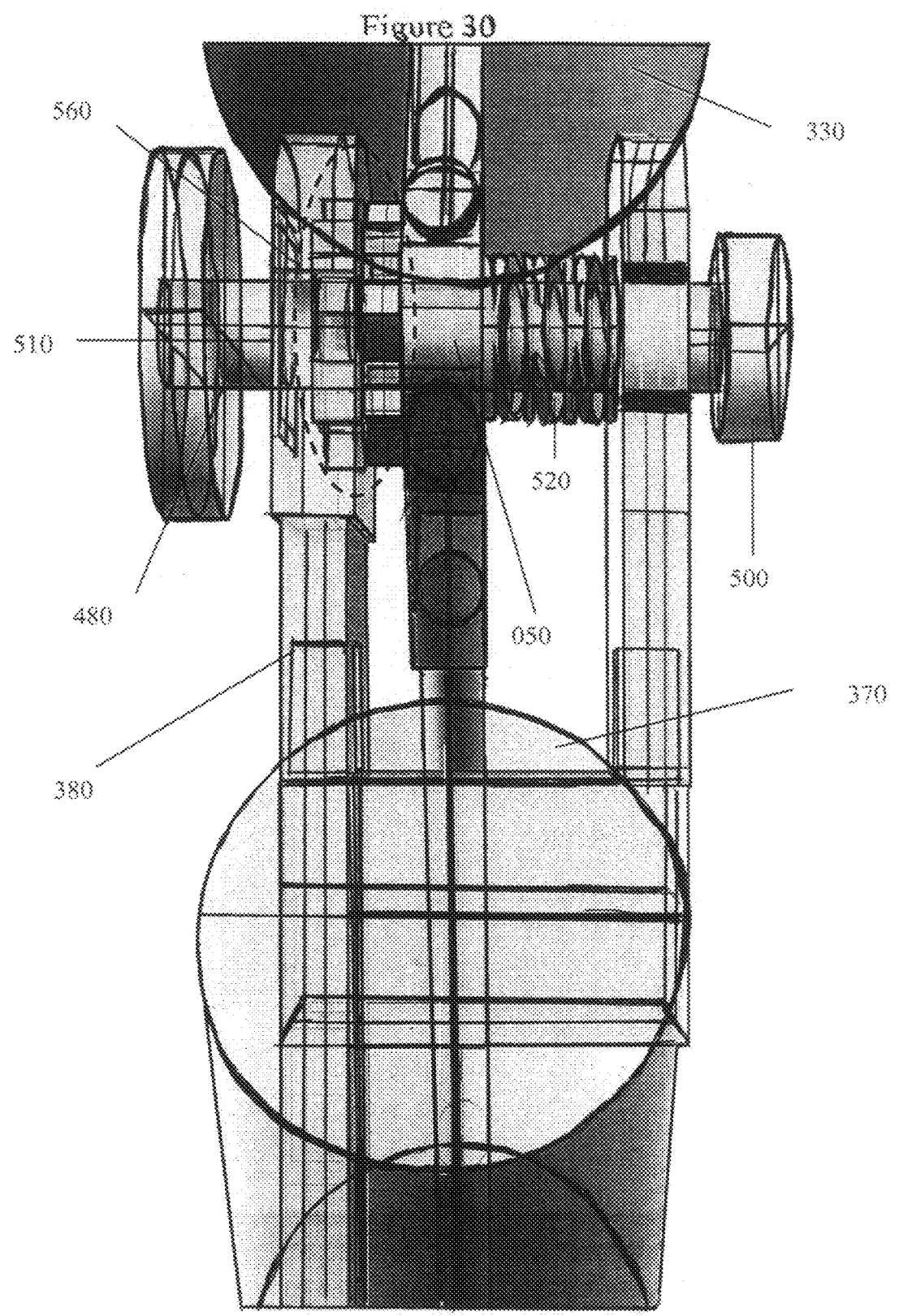

FIG. 30) shows a close-up view of the "attachable & detachable painter's tool" with star shaped male and female rotate & lock mating shape coupling mechanism that is disengaged by a spring loaded bolt attached to a fork shaped handle.

Figure 31:
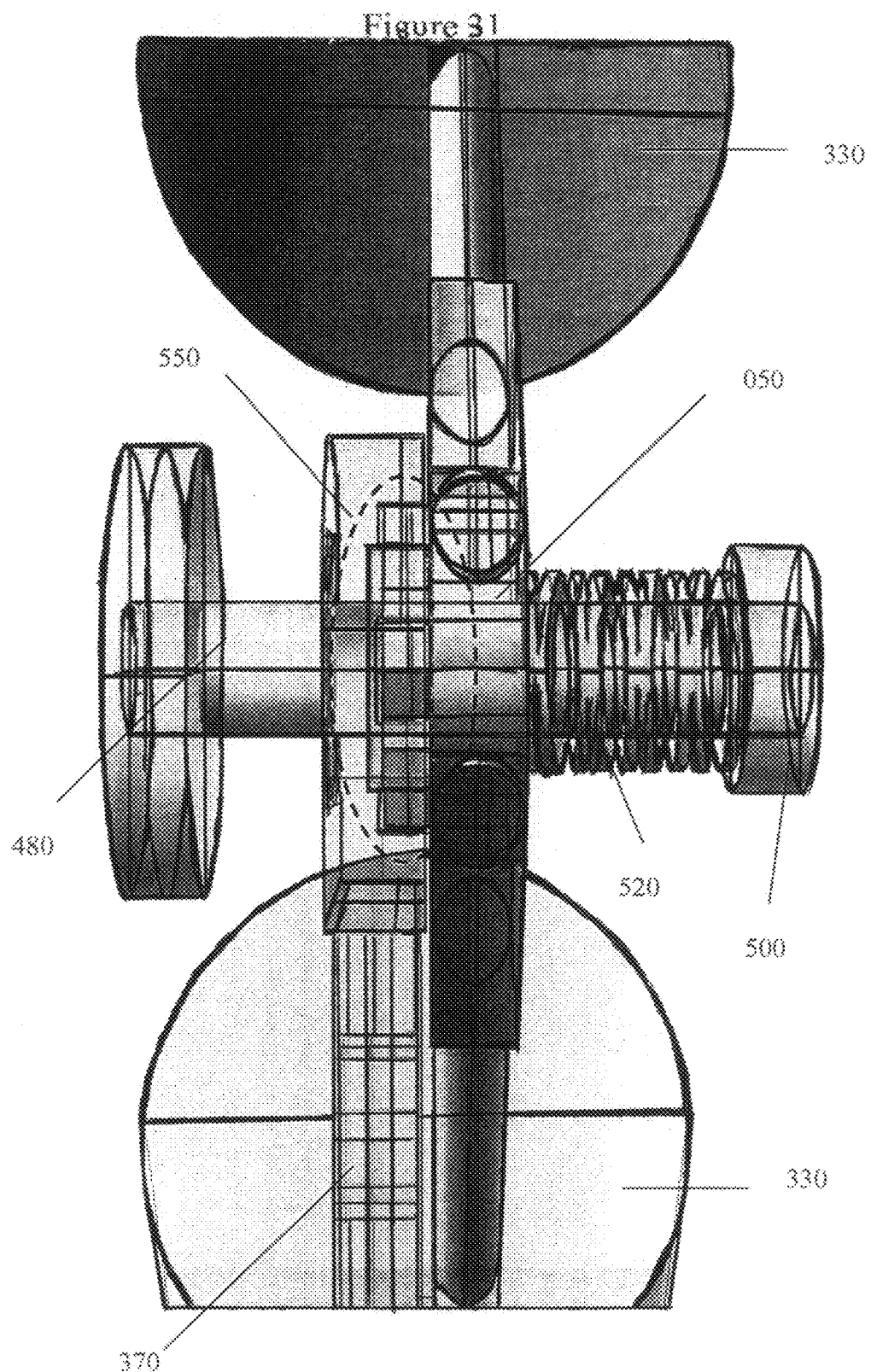

FIG. 31) shows a close-up view of the "attachable & detachable painter's tool" with star shaped male and female rotate & lock mating shape coupling mechanism that is engaged by a spring loaded bolt attached to a flat shaped handle.

Figure 32:
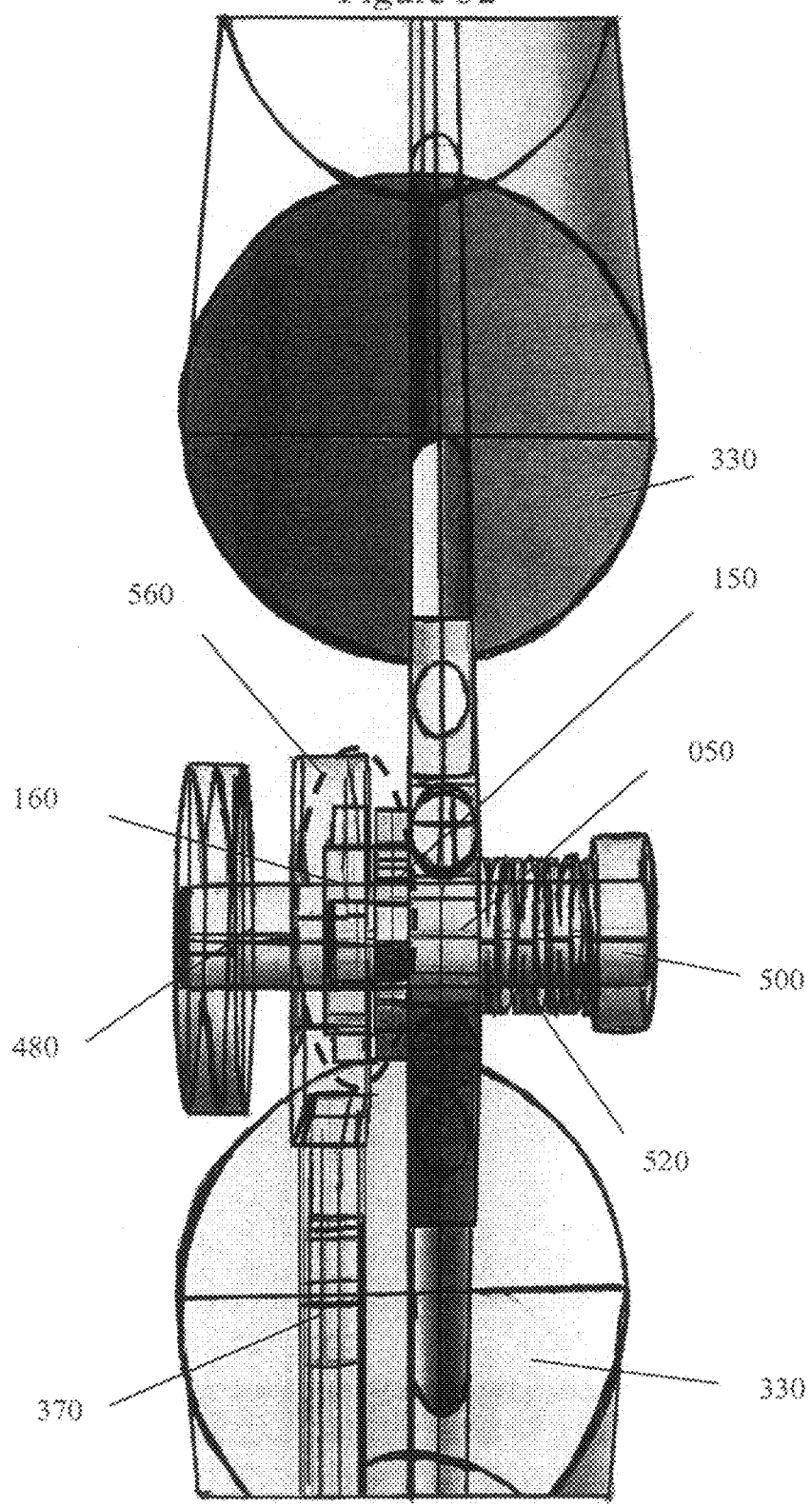

FIG. 32) shows a close-up view of the "attachable & detachable painter's tool" with star shaped male and female rotate & lock mating shape coupling mechanism that is disengaged by a spring loaded bolt attached to a flat shaped handle.

Figure 33:
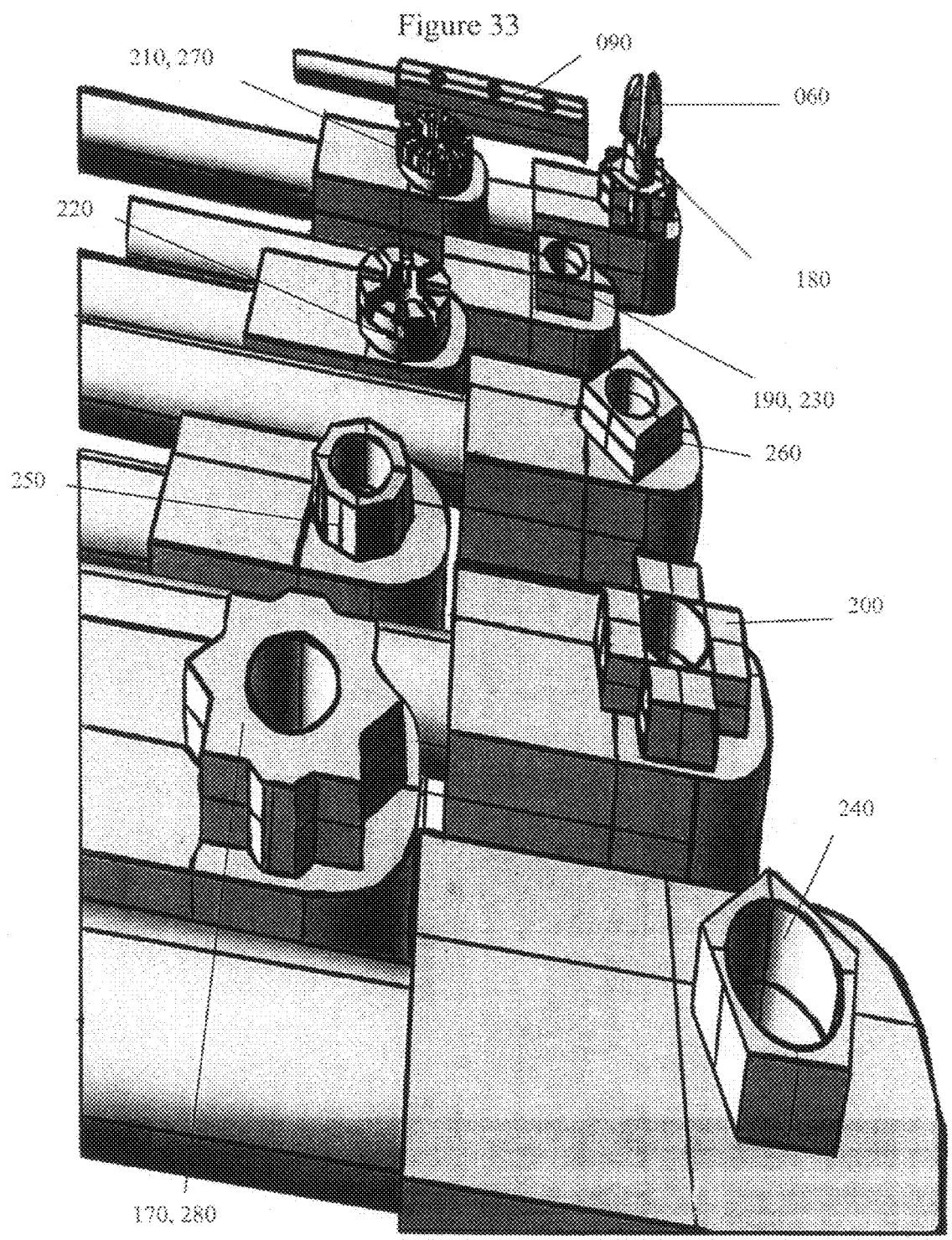

FIG. 33) shows various painting arm coupling shapes multiple circles pivots locations, pointed teeth coupling, straight teeth coupling, octagon coupling, star shaped coupling, star shaped coupling with clip, square coupling, diamond shaped coupling, cross shaped coupling, and hexagon shaped coupling which all fit the mating opposite male or female shape.

Figure 34:
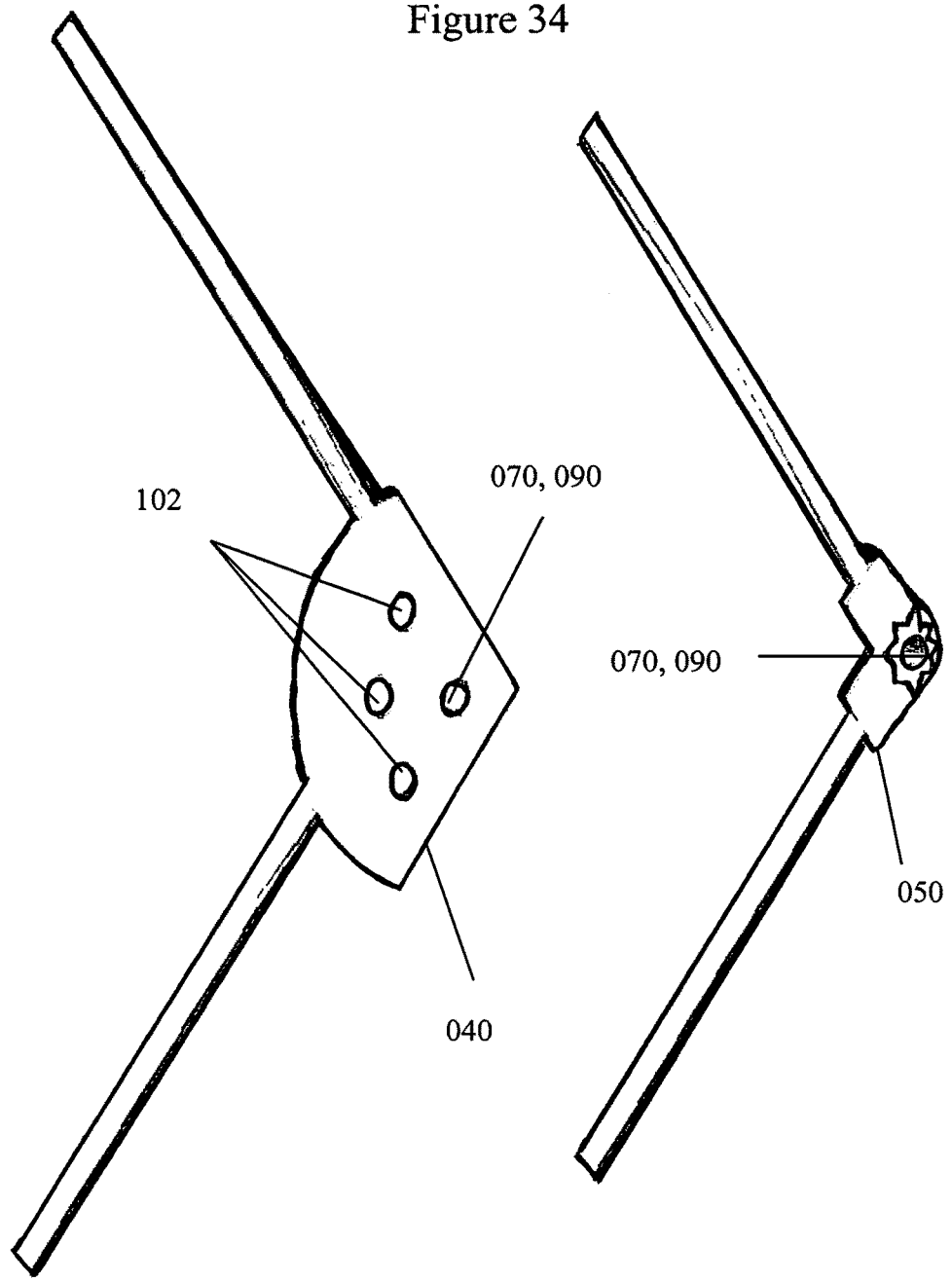

FIG. 34) shows two dual painting arm attachments pivot and lock mechanisms a) one pivot hole and 3 angle location holes to lock painting arm at a different angles when secured with a bolt and b) the paint arm with a star shape coupling to set the arm to the desired angle and keep the arm from rotating when engage with a female mating part in the handle and secured with a bolt in center of star shaped coupling.

FIG. 35) various types of handles that are used with the "attachable & detachable painter's tool".

FIG. 36) various types of painting attachment arms that are used with the "attachable & detachable painter's tool".

REFERENCE NUMERALS IN DRAWINGS 010 attachable & detachable painter's tool
020 painter's tool attachment working arm
030 dual shaft painter's tool attachment working arm
040 dual shaft painter's tool attachment 90 degree working arm
050 dual shaft painter's tool attachment 90 degree working arm with male protruded shape coupling key
052 working arm attachment plate
060 locator for setting angled position of painter's arm
070 pivot location for painter's arm
072 8 pointed star positioning locations
080 pivot bolt
082 position lock bolt
084 spring
086 spring resting hole
088 nut
090 pivot center hole
102 plate positioning hole
120 pivot boss
122 pivot boss with center hole
130 position lock boss
140 mating connection coupling connection
142 polygon shaped mating coupling connection
150 male protruded shape key for insertion into mating female cavity shape.
152 male polygon protrusion key
154 8 pointed male star shaped protrusion key
160 female cavity shape key for reception of male protruded shape key
162 female polygon cavity coupling key
164 8 pointed female star shaped cavity
170 star shaped coupling key for inserting into mating female shape
180 star shaped coupling key with fastening insert for inserting into mating female shape
190 square shaped coupling key for inserting into mating female shape
200 cross shaped coupling key for inserting into mating female shape
210 saw toothed shaped coupling key for inserting into mating female shape
220 flat toothed shaped coupling key for inserting into mating female shape
230 polygon shaped coupling key for inserting into mating female shape
240 hexagon shaped coupling key for inserting into mating female shape
250 octagon shaped coupling key for inserting into mating female shape
260 diamond shaped coupling key for inserting into mating female shape
270 bottled capped shaped coupling key for inserting into mating female shape
280 gear shaped coupling key for inserting into mating female shape
290 sphere shaped coupling key for inserting into mating female shape
300 cylinder shaped coupling key for inserting into mating female shape
310 painting working arm
320 painting attachment shaft
325 painting attachment rod with lever
330 paint roller cover
340 polygon foam paint pad attachment working arm
350 triangle foam paint pad attachment working arm
360 90 degree dual surface foam paint pad attachment working arm
362 sanding pad attachment working arm
364 paint applicator attachment working arm
370 handle
372 handle head
374 handle gripping end
380 forked shaped handle
390 handle with internal thread 400 handle with female shaped cavity
402 handle with male shaped protrusion
410 handle center pivot hole
420 handle head positioning holes
430 handle lever
440 handle lever pivot spring
450 handle lever pivot bolt
460 Handle lever pivot nut
470 handle anti-rotation locking boss
480 handle engagement bolt
490 handle engagement bolt thread
500 handle engagement nut
510 handle engagement knob
520 handle engagement spring
525 handle permanent arm attachment rod
530 paint brush attachment working arm
540 paint scrapper attachment working arm
550 engaged mating shaped coupling
560 disengaged mating shaped coupling

DESCRIPTION

First Preferred Attachable & Detachable Painter's Tool

A first preferred embodiment of the "attachable & detachable painter's tool" is illustrated in FIG. 1A. The "attachable & detachable painter's tool 010" main parts generally comprise of a handle 370, a painter's tool attachment working arm 020 and a polygon shaped mating coupling connection 142 for setting the angle of operation for the working arm and then providing anti rotation during operation of the working arm.

The handle 370, includes a handle head 372, at one end and a handle gripping end 374, at the opposite end. The handle head 372, includes an 8 pointed male star shaped protrusion key 152, with 8 pointed star positioning locations 072, and a handle center pivot hole 410, in the center of the 8 pointed male star shaped protrusion key 152.

The painter's tool attachment working arm 020, includes a painting attachment shaft 320 and a working arm attachment plate 052. The working arm attachment plate 052, includes a spring resting hole 086, a pivot boss with center hole 122, an 8 pointed female star shaped cavity 164, and 8 pointed star positioning locations 072.

The 8 pointed male star shaped protrusion key 152, of the handle 370, is inserted into the 8 pointed female star shaped cavity 164 of the painter's tool attachment working arm 020, with the 8 pointed star positioning locations 072, aligning in such a way to form a polygon shaped mating coupling connection 142. A spring 084 is inserted in the spring resting hole 086, and a pivot bolt 080 is inserted through the spring 084 through the pivot boss with center hole 122, through the handle center pivot hole 410 and a nut 088, is attached to the end of the pivot bolt 080 and tighten to keep the handle 370 and painter's tool attachment working arm 020 fully engaged to create an engaged mating shaped coupling 550.

A paint roller cover 330, is then slipped onto the painter's tool attachment working arm 020 and the attachable & detachable painter's tool is ready for operation.

The force of the spring 084, is what keeps the handle 370, engaged into the painter's tool attachment working arm 020. Allowing the 8 pointed male star shaped protrusion key 154, to be inserted into the 8 pointed female star shaped cavity 164. When separating the handle 370 from the painter's tool attachment working arm 020, the spring 084 is compressed and the 8 point male star shaped protrusion key 154 is removed from the 8 pointed female star shaped cavity 164 which allows for the painter's tool attachment working arm 020, to be rotated to a new position in relation to the handle 370, and reinserted into the handle 370 by the force of the spring 084 when it is released.

The attachable & detachable painter's tool 010, is manufactured in a plurality of ways comprising molded, machined, laser cut, water cut, plasma cut, wire EDM cut, die cut and stamped. The preferred method is injection molding due to the low cost for high volume. There are a plurality of materials the attachable & detachable painter's tool 010, is made from comprising plastic, metal, and wood. The preferred material is plastic in high volume applications.

Second Preferred Attachable & Detachable Painter's Tool

A second preferred embodiment of the "attachable & detachable painter's tool" is illustrated in FIG. 2. The "attachable & detachable painter's tool 010" main parts generally comprise of a handle 370, a painter's tool attachment working arm 020 and a mating connection coupling connection 140, for setting the angle of operation for the working arm and then providing anti rotation during operation of the working arm.

The handle 370, includes a handle head 372 at one end and a handle gripping end 374 at the other end. The handle head 372 including a handle center pivot hole 410, and handle head positioning hole 420.

The painter's tool attachment working arm 020, includes a dual shaft painter's tool attachment 90 degree working arm 040, working arm attachment plate 052, painting attachment shaft 320, a pivot center hole 090 and three plate positioning holes 102.

The mating connection coupling connection 140 is engaged when a pivot bolt 080 is insert into the handle center pivot hole 410 and into the pivot center hole 090 and by inserting a position lock bolt 082 into the handle head positioning hole 420 and into one of the three desired plate positioning holes 102 and securing both bolts with a nut 088. By inserting the two bolts through the two holes is what prevents the arm from rotating out of position when in use, even if the bolts are not fully tightened all the way because anti rotation is not dependent on bolt torque as is the case with other adjustable painting tools, although both bolts must be thru the pivot center hole 090, Handle center pivot hole 410, the plate positioning hole 102 and the handle head positioning hole 420 in order achieve anti rotation of the painter's tool attachment working arm 020.

Once both bolts are thru each set of holes then a painting tool is attached to the painter's tool attachment working arm 020. In this preferred FIG. 2 the painter's tool attachment arm 020 is a dual painter's tool attachment 90 degree arm 040, with two painting attachment shafts 320 at 90 degrees apart from each other, where each painting attachment shaft 320, has a paint roller cover 330 slid onto each painting attachment shaft 320.

The attachable & detachable painter's tool 010, is manufactured in a plurality of ways comprising molded, machined, laser cut, water cut, plasma cut, wire EDM cut, die cut and stamped. The preferred method is injection molding due to the low cost for high volume. There are a plurality of materials the attachable & detachable painter's tool 010, is made from comprising plastic, metal, and wood. The preferred material is plastic in high volume applications.

Advantages

From the description above, a number of advantages of the "attachable & detachable painter's tool" has become evident:
(i) provides a better way to connect multiple painting tools to one handle;
(j) provides a faster way to rotate and lock a painting tool after making positional adjustments to the painting tools attached to one handle;

(k) provides a better locking mechanism, thru use of shape coupling, to prevent the painting tool from rotating during operation;

(l) provides a more efficient way of painting, staining, dusting, polishing, striping, sanding, cleaning, wiping off or applying chemicals (liquid and powder) to objects comprising bars, posts, poles, shafts, spindles, railings, supports, walls and columns but not limiting to the aforementioned group of objects;

(m) provides an easier way of painting, staining, dusting, polishing, striping, sanding, cleaning, wiping off or applying chemicals (liquid and powder) to objects comprising bars, posts, poles, shafts, spindles, railings, supports, walls and columns but not limiting to the aforementioned group of objects;

(n) provides a simple way paint, stain, dust, polish, strip, sand, clean, wipe off & apply chemicals (liquid and powder) to multisided objects comprising bars, posts, poles, shafts, spindles, railings, supports, and columns but not limiting to the aforementioned group of objects;

(o) provides a reduction in the number of people require to paint, stain, dust, polish, strip, sand, clean, wipe off & apply chemicals (liquid and powder) to multisided objects comprising bars, posts, poles, shafts, spindles, railings, supports, and columns but not limiting to the aforementioned group of objects;

(p) provides a better way to paint, stain, dust, polish, strip, sand, clean, wipe off & apply chemicals (liquid and powder) to multisided objects comprising bars, posts, poles, shafts, spindles, railings, supports, and columns but not limiting to the aforementioned group of objects;

Operation (Attachable & Detachable Painter's Tool)

The first step would be to determine what application the "attachable & detachable painter's tool" is going to be used in. This would determine which roller material you needed. If you were painting, staining, dusting, polishing, striping, cleaning, wiping off & applying chemicals (liquid and powder), drying, sanding, or scraping each of theses different operations would require you to pick out a different roller material for that specific operation. Once you have decided what roller material you need for the specific job, such as needing a painting roller material for painting porch railing, you would then be ready to start using the "attachable & detachable painter's tool".

Using the first preferred tool in FIG. 1A, an operator would have to adjust the angle of the paint roller cover and working arm by pulling on the painting working arm plate and separating it from the handle so the spring would compress and the star shaped key in the handle would be disengaged from the star shaped cavity in the painting working arm allowing the painting working arm to be rotated to another angle position in relation to the handle. All angle positions are determined by the angle of the star shape and there are 3 main working angles that form between the painting working arm and the handle, the 90 degree angle is for painting a flat surface such as a wall, the 135 degree angle allows for round railing and spindles to be painted and the 180 degree angle allows for the sides of square objects to be painted or for painting in between objects. When the desire angle is reach then the operator would release the painting working arm allowing the spring to extend and force the star shaped male key into the female star shaped cavity and once again lock the painting arm at a set angle position at 90, 135 or 180 degrees in relation to the handle and to prevent the painting working arm from moving out of its angled position in relation to the handle during painting objects.

With the second preferred tool an operator would adjust the dual painter's attachment 90 degree arm by inserting a bolt into one of the three position lock holes which would change the position of the vertex formed by both rods. To paint round bars the preferred position and lock hole would be the middle hole and this configuration is seen in FIG. 2. To paint square bars the preferred position and lock hole would be the last hole and this configuration is seen in FIG. 3. To paint a flat surface the preferred position and lock hole would be the first hole and this configuration is seen in FIG. 4 although one must also remove the bottom roller cover to prevent it hitting the handle. Once the desired arm position and lock hole is selected a bolt is inserted through this hole in the arm and also in the handle and tighten with a nut. In addition, a bolt is inserted into the arm and handle arm pivot hole to complete the anti rotation and position coupling key connection to prevent the arm from rotation in relation to the handle during painting.

An operator would then put the handle of the "attachable & detachable painter's tool" in the palm of his hand and wrap his fingers around the handle. While holding the "attachable & detachable painter's tool", dip the roller covers into the paint, stain, polish, stripping compound, or other chemicals (liquid and powder). Use a special pan to wipe off excess coating from the roller covers, before application, to ensure uniform coating is left on the roller covers without coating dripping from the roller covers. If it is a dusting, sanding or wiping operation where no coating will be applied to a multisided object then there will be no need to dip the roller covers into a substance or coating.

Place the roller covers around the multisided object. After the roller cover opening is around the multisided object, proceed to move along the right surface area length of the multisided object to ensure that the rollers are applied around a 180 degree section of the entire surface area length of the right side of the multisided object.

As you use the handle to apply pressure against the multisided object with the roller covers, the roller covers will rotate as you move up and down along the surface area length of the multisided object. Then while standing on the same side of the multisided object, flip the multi-head opening so that the opening facing the opposite direction. Then proceed to roll along the left surface area length of the multisided object to ensure that the coating is being applied to the other 180-degree section of the surface area length of the left side of the multisided object.

The roller covers should form a loop around the multisided object allowing you to apply liquid or powder to part or all of the surface area of the of the multisided object. Sometimes it may be necessary to flip the "attachable & detachable painter's tool" over causing the roller covers to face the opposite direction so that the other sections of the multisided object can also be acted upon by the roller covers. This application is repeated until the entire surface area of the multisided object, 360 degrees around, is covered by the roller covers ensuring that the liquids or powder on the roller covers is applied to the multisided object's complete surface or if no chemicals are used the roll material has acted on the entire surface of the multisided object. This can all be done from standing on one side of the multisided object.

In the dusting, drying, sanding and surface stripping applications the same process as above is repeated except there is no liquid or power being applied to the multisided objects. The roller material of the roller cover is only being applied to the surface area of the multisided object and these different roller materials act on the object to dust, dry, sand and strip the surface area of the multisided object. This process is repeated until the entire surface area of the multisided object, 360 degrees around the entire surface area of the object is dusted, dried, sanded, or stripped.

CONCLUSIONS, RAMIFICATIONS, AND SCOPE

Accordingly, the reader will see that the "attachable & detachable painter's tool" of this invention has advantages in that
  (a) it provides a better way to connect multiple painting tools to one handle;
  (b) it provides a faster way to rotate and lock a painting tool after making positional adjustments to the painting tools attached to one handle;
  (c) it provides a better locking mechanism, thru use of shape coupling, to prevent the painting tool from rotating during operation;
  (d) it provides a more efficient way of painting, staining, dusting, polishing, striping, sanding, cleaning, wiping off or applying chemicals (liquid and powder) to objects comprising bars, posts, poles, shafts, spindles, railings, supports, walls and columns but not limiting to the aforementioned group of objects;
  (e) it provides an easier way of painting, staining, dusting, polishing, striping, sanding, cleaning, wiping off or applying chemicals (liquid and powder) to objects comprising bars, posts, poles, shafts, spindles, railings, supports, walls and columns but not limiting to the aforementioned group of objects;
  (f) it provides a simple way paint, stain, dust, polish, strip, sand, clean, wipe off & apply chemicals (liquid and powder) to multisided objects comprising bars, posts, poles, shafts, spindles, railings, supports, and columns but not limiting to the aforementioned group of objects;
  (g) it provides a reduction in the number of people require to paint, stain, dust, polish, strip, sand, clean, wipe off & apply chemicals (liquid and powder) to multisided objects comprising bars, posts, poles, shafts, spindles, railings, supports, and columns but not limiting to the aforementioned group of objects;
  (h) it provides a better way to paint, stain, dust, polish, strip, sand, clean, wipe off & apply chemicals (liquid and powder) to multisided objects comprising bars, posts, poles, shafts, spindles, railings, supports, and columns but not limiting to the aforementioned group of objects;
Further objectives and advantages of my invention will become apparent from a consideration of the drawings and ensuing description. Although the description above contains much specificity, these should not be construed as limiting the scope of the invention but as merely providing illustrations of some of the presently preferred embodiments of the invention.
Thus the scope of the invention should be determined by the appended claims and their legal equivalents, rather than just by the examples given.

I claim:
1. An adjustable paint roller comprising:
  a working arm having a left end and a right end, whereby a working arm connection means is located at said right end of said working arm and a working arm shaft is extending from said working arm connection means towards said left end of the working arm;
  a handle having a top end and a bottom end, whereby a handle holding position is located at said bottom end and a handle connection means is located at said top end;
  a retainer comprising a bolt, shaft, rod, pin, or rivet for securing said working arm connection means to said handle connection means creating a one piece painting frame and limiting how far said working arm connection means can be separated from said handle connection means;
  a spring for forcing said working arm connection means and said handle connection means together while said adjustable paint roller is in use;
  a paint roller cover that has an inner diameter core that slides onto the outer diameter of said working arm shaft and when in use said paint roller cover rotates around said working arm shaft allowing paint to roll from said paint roller cover onto an object that an operator desires to paint or stain;
  said working arm connection means comprising a front side, a bottom side, a recessed spring pocket hole, a guiding boss, a working arm thru hole, and an 8 pointed star shaped female cavity, whereby on said front side, said spring recessed pocket hole is located for accepting said spring and said retainer, and on said bottom side, said 8 pointed star shaped female cavity is located and said guiding boss centrally extends from said 8 pointed star shaped female cavity and said working arm thru hole starts from the center of said recessed spring pocket hole on said front side and extends all the way thru the center of said guiding boss on said back side allowing said retainer to extend all the way thru said working arm thru hole to connect said working arm connection means to said handle connection means,
  said handle connection means comprising an up side, a down side, an 8 pointed star shaped male protrusion, and a handle thru hole, whereby on said up side of said handle connection means said 8 pointed star shaped male protrusion is located and said handle thru hole extends from the center of said 8 point star shaped male protrusion to the down side of said handle connection means allowing said guiding boss to extend into said handle thru hole while said 8 pointed star shaped male protrusion is inserted into said 8 pointed star shaped female cavity deep enough to be secured together by said retainer and to be held together by only the force of said spring,
  whereby said spring acts on said working arm connection means and said handle connection means by way of said retainer to keep said 8 pointed star shaped male protrusion engaged and deeply inserted into said 8 pointed star shaped female cavity during use of said adjustable paint roller to prevent said working arm from moving in relation to said handle, and when an operator disengages the paint roller by pulling said 8 pointed star shaped male protrusion out of the 8 pointed star shaped female cavity against the force of said spring, said working arm is allowed to move in angle increments of 45 degrees defined by the 8 points on the star shape of said 8 pointed star shaped female cavity and on said 8 pointed star shaped male protrusion, which forces said handle and said working arm to be at an angle comprising 90 degrees, 135 degrees or 180 degrees apart, and once said angle is determine by the operator said working arm connection means and said handle connection means are released by said operator to allow said spring to once again act on said working arm connection means and said handle connection means to push them together to keep said 8 pointed star shaped male protrusion deeply inserted into said 8 pointed star shaped female cavity during use of said adjustable paint roller to prevent said working arm from moving in relation to said handle and creating a quick way to adjust the working arm & handle connection means, whereby said guiding boss has a small clearance with said handle thru hole to limit side play while still allowing the boss to rotate inside of said handle thru hole and furthermore the boss is long enough to still be engaged into said handle thru hole while the handle & working arm connect means is disengaged but retained by said retainer thus keeping said 8 pointed star shape male protrusion in axial alignment at all times with said 8 pointed star shaped female cavity making it quick and easy to reengage said 8 pointed star shape male protrusion into said 8 pointed star shaped female cavity, whereby said recessed spring pocket hole will partially or fully enclose the length of said spring and allows for said retainer to be shorter in length which allows the overall combined size of said handle connection means and said working arm connection means to be smaller and thus have less of a chance to interfere with said object to be painted when said adjustable paint roller is in use and makes the working arm & handle connection means more visually appealing.

2. The adjustable paint roller device of claim 1 wherein said 8 pointed star shaped female cavity or 8 pointed star shaped male protrusion is attached to a location on said adjustable paint roller comprising said handle or said working arm.

3. The adjustable paint roller device of claim 1, wherein said guiding boss is attached to a location on said adjustable paint roller comprising said handle or said working arm.

4. The adjustable paint roller device of claim 1, wherein said recessed spring pocket hole is attached to a location on said adjustable paint roller comprising said handle or said working arm and contains a spring with a spring rate between 1 pound/inch to 30 pound/inch.

5. The adjustable paint roller device of claim 1, wherein said handle has a hole for hanging said adjustable paint roller and for additional tool attachments located at the bottom side of said handle.

6. The adjustable paint roller device of claim 1, wherein said handle connection means and said working arm connection means has an overall outer form which is curved or cylindrical in nature with said 8 pointed star shaped male protrusion and 8 pointed star shaped female cavity inscribed.

7. The adjustable paint roller device of claim 1, wherein said retainer is held secured at its end comprising a nut, lock-washer, crimp, cotter pin, clip, spun-over metal, or fastener.

8. A hand tool comprising:
a working arm having a left end and a right end, whereby a working arm connection means is located at said right end of said working arm and a working arm tool attachment member extending from said working arm connection means towards said left end of the working arm;
a handle having a top end and a bottom end, whereby a handle holding position is located at said bottom end and a handle connection means is located at said top end;
a retainer comprising a bolt, shaft, rod, pin, or rivet for securing said working arm connection means to said handle connection means creating a one piece hand tool frame and limiting how far said working arm connection means can be separated from said handle connection means;
a spring for forcing said working arm connection means and said handle connection means together while said hand tool is in use;
an end of arm tool comprising a paint roller cover, paint scraper, paint brush, lent brush, dusting brush, and window wiper, for attachment to said working arm tool attachment member;
said working arm connection means comprising a front side, a bottom side, a recessed spring pocket hole, a guiding boss, a working arm thru hole, and a female coupling cavity, whereby on said front side, said spring recessed pocket hole is located for accepting said spring and said retainer, and on said bottom side, said female coupling cavity is located and said guiding boss centrally extends from said female coupling cavity and said working arm thru hole starts from the center of said recessed spring pocket hole on said front side and extends all the way thru the center of said guiding boss on said back side allowing said retainer to extend all the way thru said working arm thru hole to connect said working arm connection means to said handle connection means,
said handle connection means comprising an up side, a down side, a male coupling protrusion, and a handle thru hole, whereby on said up side of said handle connection means said male coupling protrusion is located and said handle thru hole extends from the center of said male coupling protrusion to the down side of said handle connection means allowing said guiding boss to extend into said handle thru hole while said male coupling protrusion is inserted into said female coupling cavity deep enough to be secured together by said retainer and to be held together by only the force of said spring,
whereby said spring acts on said working arm connection means and said handle connection means by way of said retainer to keep said male coupling protrusion engaged and deeply inserted into said female coupling cavity during use of said hand tool to prevent said working arm from moving in relation to said handle, and when an operator disengages said hand tool by pulling said male coupling protrusion out of the female coupling cavity against the force of said spring, said working arm is allowed to move in angle increments of 45 degrees defined by the shape or position of said female coupling cavity and said male coupling protrusion, which forces said handle and said working arm to be at an angle comprising 90 degrees, 135 degrees or 180 degrees apart, and once said angle is determine by the operator said working arm connection means and said handle connection means are released by said operator to allow said spring to once again act on said working arm connection means and said handle connection means to push them together to keep said male coupling protrusion deeply inserted into said female coupling cavity during use of said hand tool, to prevent said working arm from moving in relation to said handle and creating a quick way to adjust the working arm & handle connection means,
whereby said guiding boss has a small clearance with said handle thru hole to limit side play while still allowing the boss to rotate inside of said handle thru hole and furthermore the boss is long enough to still be engaged into said handle thru hole while the handle & working arm connection means is disengaged but retained by said retainer, thus keeping said male coupling protrusion in axial alignment at all times with said female coupling cavity making it quick and easy to reengage said male coupling protrusion into said female coupling cavity,
whereby said recessed spring pocket hole will partially or fully enclose the length of said spring and allows for said retainer to be shorter in length which allows the overall combined size of said handle connection means and said working arm connection means to be smaller and thus have less of a chance to interfere with said object to be painted when said hand tool is in use and makes the working arm & handle connection means more visually appealing.

9. The hand tool device of claim 8, wherein said female coupling cavity or said male coupling protrusion is attached to a location on said hand tool comprising said handle or said working arm.

10. The hand tool device of claim 8, wherein said guiding boss is attached to a location on said hand tool comprising said handle or said working arm.

11. The hand tool device of claim 8, wherein said recessed spring pocket hole is attached to a location on said hand tool comprising said handle or said working arm and contains a spring with a spring rate between 1 pound/inch to 30 pound/inch.

12. The hand tool device of claim 8, wherein said handle connection means and said working arm connection means has an overall outer form which is curved or cylindrical in nature with said male coupling protrusion and female coupling cavity inscribed.

13. The hand tool device of claim 8, wherein said retainer is held secured at its end comprising a nut, lock-washer, crimp, cotter pin, clip, spun-over metal, or fastener.

14. The hand tool device of claim 8, wherein said female coupling cavity and male coupling protrusion pair allow said working arm and said handle to form a 90 degree, 135 degree and 180 degree angles with the cavity and protrusion comprising; a female polygon shape cavity and male polygon shaped protrusion mating pair, female hole cavities and male rod protrusion mating pairs, female valley teeth cavities and male peak teeth protrusion mating pairs.

15. An adjustable paint roller comprising:
a working arm having a left end and a right end, whereby a working arm connection means is located at said right end of said working arm and a working arm shaft extending from said working arm connection means towards said left end of the working arm;
a handle having a top end and a bottom end, whereby a handle holding position is located at said bottom end and a handle connection means is located at said top end;
a retainer comprising a bolt, shaft, rod, pin, or rivet for securing said working arm connection means to said handle connection means creating a one piece painting frame and limiting how far said working arm connection means can be separated from said handle connection means;
a spring for forcing said working arm connection means and said handle connection means together while said adjustable paint roller is in use;
a paint roller cover that has an inner diameter core that slides onto the outer diameter of said working arm shaft and when in use said paint roller cover rotates around said working arm shaft allowing paint to roll from said paint roller cover onto an object that an operator desires to paint or stain;
said working arm connection means comprising a front side, a bottom side, a recessed spring pocket hole, a guiding boss, a working arm thru hole, and a female coupling cavity, whereby on said front side, said spring recessed pocket hole is located for accepting said spring and said retainer, and on said bottom side, said female coupling cavity is located and said guiding boss centrally extends from said female coupling cavity and said working arm thru hole starts from the center of said recessed spring pocket hole on said front side and extends all the way thru the center of said guiding boss on said back side allowing said retainer to extend all the way thru said working arm thru hole to connect said working arm connection means to said handle connection means,
said handle connection means comprising an up side, a down side, a male coupling protrusion, and a handle thru hole, whereby on said up side of said handle connection means said male coupling protrusion is located and said handle thru hole extends from the center of said male coupling protrusion to the down side of said handle connection means allowing said guiding boss to extend into said handle thru hole while said male coupling protrusion is inserted into said female coupling cavity deep enough to be secured together by said retainer and held together by only the force of said spring,
whereby said spring acts on said working arm connection means and said handle connection means by way of said retainer to keep said male coupling protrusion engaged and deeply inserted into said female coupling cavity during use of said adjustable paint roller to prevent said working arm from moving in relation to said handle, and when an operator disengages said adjustable paint roller by pulling said male coupling protrusion out of the female coupling cavity against the force of said spring, said working arm is allowed to move in angle increments of 45 degrees defined by the shape of said female coupling cavity and said male coupling protrusion, which forces said handle and said working arm to be at an angle comprising 90 degrees, 135 degrees or 180 degrees apart, and once said angle is determine by said operator said working arm connection means and said handle connection means are released by said operator to allow said spring to once again act on said working arm connection means and said handle connection means to push them together to keep said male coupling protrusion deeply inserted into said female coupling cavity during use of said adjustable paint roller to prevent said working arm from moving in relation to said handle, thereby creating a quick way to adjust the working arm & handle connection means,
whereby said guiding boss has a small clearance with said handle thru hole and the boss is long enough that the boss is still engaged into said handle thru hole to limit side play while still allowing the boss to rotate inside of said handle thru hole while the handle & working arm connection means is disengaged but retained by said retainer thus keeping said male coupling protrusion in axial alignment at all times with said female coupling cavity making it quick and easy to reengage said male coupling protrusion into said female coupling cavity,
whereby said recessed spring pocket hole will partially or fully enclose the length of said spring and allows for said retainer to be shorter in length which allows the overall combined size of said handle connection means and said working arm connection means to be smaller and thus have less of a chance to interfere with said object to be painted when said adjustable paint roller is in use and makes the working arm & handle connection means more visually appealing.

16. The adjustable paint roller device of claim 15, wherein said female coupling cavity or male coupling protrusion is attached to a location on said adjustable paint roller comprising said handle or said working arm.

17. The adjustable paint roller device of claim 15, wherein said guiding boss is attached to a location on said adjustable paint roller comprising said handle or said working arm.

18. The adjustable paint roller device of claim 15, wherein said recessed spring pocket hole is attached to a location on said adjustable paint roller comprising said handle or said working arm and contains a spring with a spring rate between 1 pound/inch to 30 pound/inch.

19. The adjustable paint roller device of claim 15, wherein said handle connection means and said working arm connection means has an overall outer form which is curved or cylindrical in nature with said male coupling protrusion and female coupling cavity inscribed.

20. The adjustable paint roller device of claim 15, wherein said retainer is held secured at its end comprising a nut, lock-washer, crimp, cotter pin, clip, spun-over metal, or fastener.

\* \* \* \* \*